US010339344B2

(12) United States Patent
Belt

(10) Patent No.: US 10,339,344 B2
(45) Date of Patent: Jul. 2, 2019

(54) ELECTROMAGNETIC MARKING DEVICE AND METHODS FOR ITS USE

(71) Applicant: Blind InSites LLC, Plano, TX (US)

(72) Inventor: Darwin Wayne Belt, Plano, TX (US)

( * ) Notice: Subject to any disclaimer, the term of this patent is extended or adjusted under 35 U.S.C. 154(b) by 0 days.

(21) Appl. No.: 16/133,830

(22) Filed: Sep. 18, 2018

(65) Prior Publication Data

US 2019/0095658 A1 Mar. 28, 2019

Related U.S. Application Data

(60) Provisional application No. 62/564,613, filed on Sep. 28, 2017.

(51) Int. Cl.
*G06K 1/12* (2006.01)

(52) U.S. Cl.
CPC .................... *G06K 1/125* (2013.01)

(58) Field of Classification Search
CPC ...................................... G06K 1/125
USPC .................................. 235/493, 492
See application file for complete search history.

(56) References Cited

U.S. PATENT DOCUMENTS

| 3,170,213 | A |   | 2/1965  | Thomas, Jr. |         |
|-----------|---|---|---------|-------------|---------|
| 5,655,266 | A | * | 8/1997  | Gish        | B42F 1/08 |
|           |   |   |         |             | 24/67.3 |
| 6,008,727 | A |   | 12/1999 | Want et al. |         |
| 6,144,299 | A |   | 7/2000  | Cole        |         |
| 7,426,197 | B2 |  | 9/2008  | Schotten et al. |     |
| 7,817,990 | B2 |  | 10/2010 | Pamminger et al. |    |
| 7,857,127 | B2 |  | 12/2010 | Lau         |         |
| 7,965,188 | B2 |  | 6/2011  | Geissler    |         |
| 8,025,227 | B2 |  | 9/2011  | Hall et al. |         |
| 8,279,065 | B2 |  | 2/2012  | Butler et al. |       |
| 8,490,882 | B2 |  | 7/2013  | Margulis    |         |
| 9,024,719 | B1 |  | 5/2015  | Saunders    |         |

(Continued)

FOREIGN PATENT DOCUMENTS

| CN | 101992628 A1 | 3/2001 |
| CN | 203054922 | 12/2012 |
| KR | 20130014287 A1 | 2/2013 |

OTHER PUBLICATIONS

Smartrac, Ratch Tag, product catalog description, Sep. 19, 2017, 2 pages, Amsterdam, Netherlands, https://www.smartrac-group.com/ratch-tag.html.

(Continued)

*Primary Examiner* — Allyson N Trail
(74) *Attorney, Agent, or Firm* — Caldwell Intellectual Property Law

(57) ABSTRACT

A system for marking objects using an electromagnetic marking device includes a first electromagnetic marking device, including a body having a top surface and a bottom surface. The body includes a first part having a through-hole in the first part, the through-hole having a first opening in the top surface of the body and a second opening in the bottom surface of the body, and a first member disposed within the through-hole, the first member including a first proximal end attached to the body and a first distal end not attached to the body. The body includes a second part attached to the first part. The electromagnetic marking device includes a signal generator attached to the second part, the signal generator further including a wave generator circuit and a wave modulator circuit.

20 Claims, 11 Drawing Sheets

(56) References Cited

U.S. PATENT DOCUMENTS

| | | | |
|---|---|---|---|
| 9,058,547 B2 | 6/2015 | Oh et al. | |
| 9,105,196 B2 | 8/2015 | Dobbs et al. | |
| 9,361,570 B2 | 6/2016 | Nitta | |
| 9,514,340 B2 | 6/2016 | Cristache | |
| 9,569,769 B2 | 2/2017 | Smith et al. | |
| 9,727,815 B2 | 8/2017 | Fein | |
| 9,830,760 B2 | 11/2017 | Fisher | |
| 2005/0157865 A1* | 7/2005 | Yeager | G07C 11/00 379/266.06 |
| 2006/0238302 A1 | 10/2006 | Loving et al. | |
| 2006/0238344 A1* | 10/2006 | Kubby | G06K 19/04 340/572.1 |
| 2007/0132592 A1 | 6/2007 | Stewart et al. | |
| 2007/0143162 A1 | 6/2007 | Keever et al. | |
| 2007/0209264 A1* | 9/2007 | Lau | B42D 5/005 40/641 |
| 2009/0094869 A1 | 4/2009 | Geissler et al. | |
| 2009/0121839 A1 | 5/2009 | Cornwell | |
| 2011/0140857 A1* | 6/2011 | Hull | G06F 17/30876 340/10.1 |
| 2011/0220724 A1* | 9/2011 | Sakama | G06K 19/07749 235/492 |
| 2012/0024963 A1* | 2/2012 | Shionoiri | G06K 19/07783 235/492 |
| 2012/0094596 A1 | 4/2012 | Tysowski | |
| 2013/0221109 A1 | 8/2013 | Kaga | |
| 2015/0041616 A1 | 2/2015 | Gentile et al. | |
| 2015/0059937 A1* | 3/2015 | Singer | A45C 1/06 150/147 |
| 2015/0077257 A1 | 3/2015 | Pokra et al. | |
| 2015/0267439 A1 | 9/2015 | Thoonsen | |
| 2017/0099347 A1 | 4/2017 | Pucha et al. | |
| 2017/0206447 A1 | 7/2017 | Sandock et al. | |
| 2018/0123645 A1 | 5/2018 | Jang | |

OTHER PUBLICATIONS

RFIDSECU, UHF RFID Wristband Tag with length adjustable, product catalog description, Mar. 22, 2016, 3 pages, Shenzhen, China, http://rfidsecu.com/Products_detail_right_all.asp?newsid=2400&productname=UHF%20RFID%20Wristband%20Tag%20with%20length%20adjustable.

RFIDSECU, UHF RFID Clip Tags, product catalog description, Mar. 22, 2016, 2 pages, Shenzhen, China, http://rfidsecu.com/Products_detail_right_all.asp?newsid=2350&productname=UHF%20RFID%20Clip%20Tags.

Burkard, Simon. Title: Near Field Communication in Smartphones. Article. Jun. 22, 2018. 10 pages. Department of Telecommunication Systems—Service-centric Networking. Berlin Institute of Technology, Germany. Berlin, Germany.

* cited by examiner

ELECTROMAGNETIC MARKING DEVICE AND METHODS FOR ITS USE

RELATED APPLICATION DATA

This application claims the benefit of priority of U.S. Provisional Patent Application Ser. No. 62/564,613, filed on Sep. 28, 2017, and titled "ELECTROMAGNETIC MARKING DEVICE AND METHODS FOR ITS USE," which is incorporated by reference herein in its entirety.

FIELD OF THE INVENTION

The present invention generally relates to the field of electronic communication devices. In particular, the present invention is directed to an electromagnetic marking device.

BACKGROUND

Labeling objects can be both difficult and essential for visually impaired persons. It is difficult because there are limited options for labeling or marking an object in a way that is discernable non-visual means. Braille works ifa person knows how to read it, but is difficult to learn and not ubiquitously known. Braille is also not easy to produce compared to writing with a pen, and produces labels that are hard to modify or swap to new objects. The use of existing labeling in general is too inflexible and time-consuming for the purposes of replacing the ease with which visual identification can explain the contents of a container, closet, or room.

SUMMARY OF THE DISCLOSURE

In an aspect, a system for marking objects using an electromagnetic marking device includes a first electromagnetic marking device, including a body having a top surface and a bottom surface. The body includes a first part having a through-hole in the first part, the through-hole having a first opening in the top surface of the body and a second opening in the bottom surface of the body, and a first member disposed within the through-hole, the first member including a first proximal end attached to the body and a first distal end not attached to the body. The body includes a second part attached to the first part. The electromagnetic marking device includes a signal generator attached to the second part, the signal generator further including a wave generator circuit and a wave modulator circuit.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

In an aspect, an electromagnetic marking device includes a first part with a signal generator and a second part that acts as a clip to attach the electromagnetic marking device to an object to be labeled. The signal generator, which may be writeable, transmits information to a computing device such as a mobile phone or tablet, either directly or via a separate transceiver; this may be accomplished using near-field communication among other things. The second portion may include a first member and/or a second member that may be inserted into openings or tabs, may grip an object against a base portion of the second portion, or may secure electromagnetic marking device to the object in various other ways. In operation, data is written to the signal generator, and the electromagnetic marking device is attached to an object; data may be metadata describing the object, which may be a document that has been printed.

Figure 1:
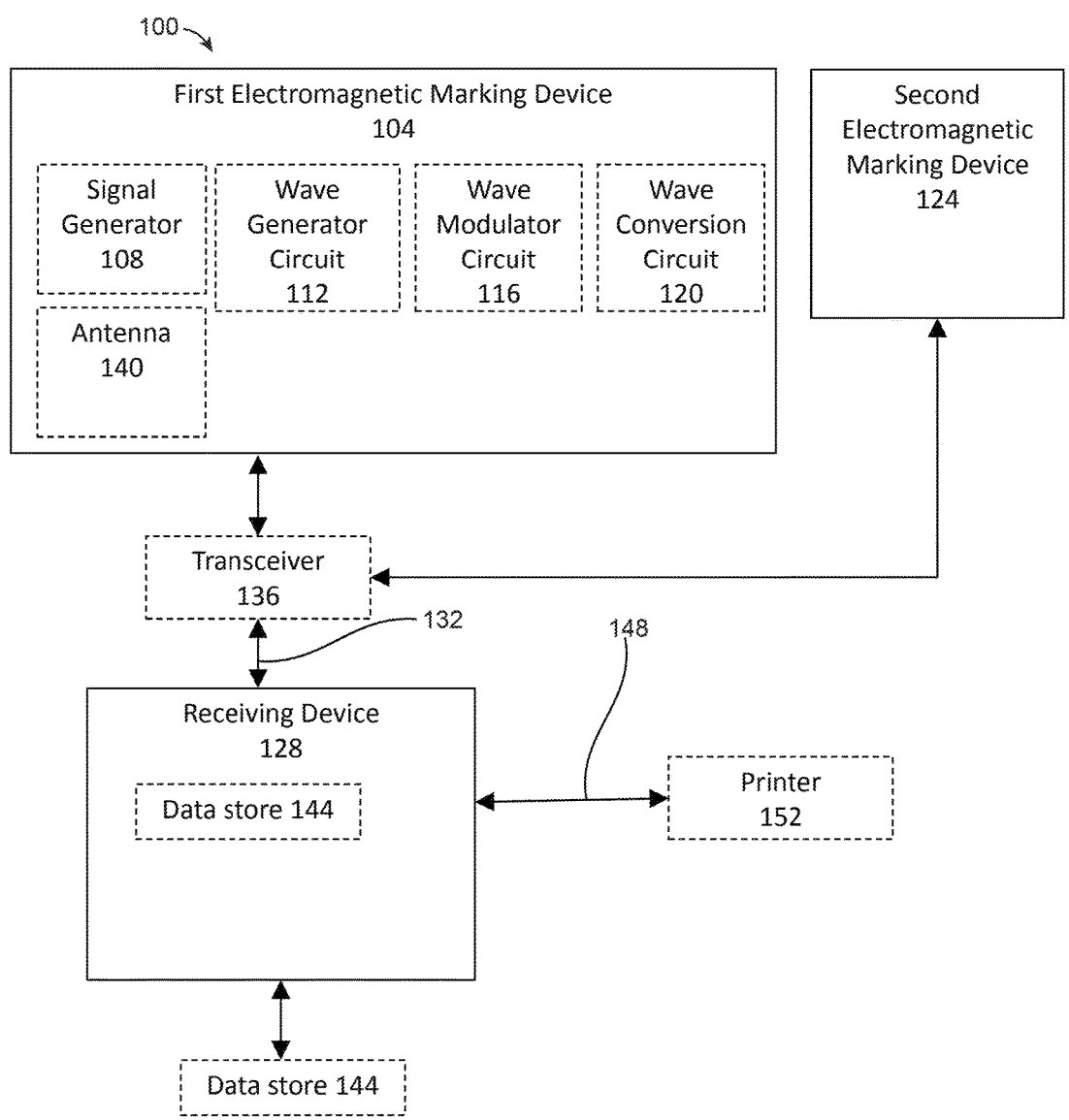
FIG. 1 is a block-diagram illustration of an exemplary system in an embodiment.

Referring now to FIG. 1, an exemplary embodiment of a system 100 for marking objects using an electromagnetic marking device is illustrated. System 100 includes a first electromagnetic marking device 104. In an embodiment, first electromagnetic marking device 104 enables a user to mark an object by affixing first electromagnetic marking device 104 to the object; wireless communication may then be used to link first electromagnetic marking device 104 to other elements of system 100 as described in further detail below.

Figure 2:
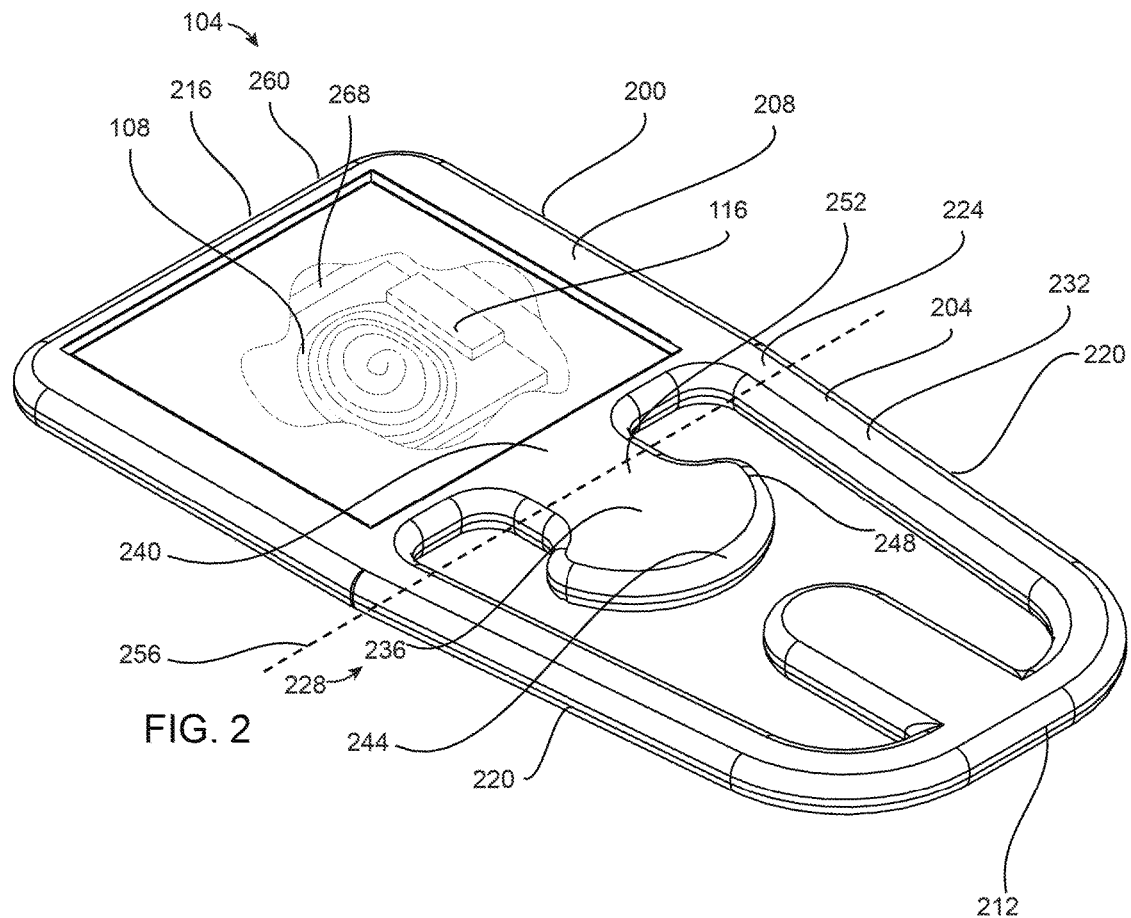
FIG. 2 is an isometric illustration of an exemplary electromagnetic marking device in an embodiment.

Referring now to FIG. 2, an exemplary first electromagnetic marking device 104 is illustrated. First electromagnetic marking device 104 includes a body 200. Body 200 includes a first part 204 and a second part 208. First electromagnetic marking device 104 includes a signal generator 108 attached to second part 208. Signal generator 108 includes a wave generator circuit 112. Body 200 may be constructed of any suitable material or combination of materials, including without limitation polymer materials such as plastic, metals in sheet or wire form, wood, ceramic, composite fiber materials such as fiberglass or carbon fiber material, or any other artificial or natural materials. Body 200 may be substantially rigid. Body 200 may be substantially elastic. Body 200 may be formed as a single monolithic unit, for instance in a single manufacturing process; as a non-limiting example body 200 may be molded or additively manufactured around signal generator 108.

Continuing to refer to FIG. 2, body 200 may have any suitable shape. For instance, body 200 may be substantially flat; body 200 may be substantially flat where body 200 has a similar relationship of thickness to width or length to that found in paperclips or similar devices to be slipped between sheets of paper or similar material. Body 200 may be substantially flat where a thickness of the body 200 is less than $1/10^{th}$ of the body's length or width. Body 200 may have a first end 212 a second end 216, and two sides 220. Body 200 may have a top surface 224 and a bottom surface 228. Body 200 may have a length, defined as the distance from first end 212 to second end 216. Body 200 may have a width, defined as the maximal distance between sides 220. Body 200 may have a thickness, defined as the distance between top surface 224 and bottom surface 228. Body 200 may have beveled or rounded edges, which may enable body 200 or a portion thereof to be slipped between sheets of paper or other material, or into cracks or slots.

With continued reference to FIG. 2, body 200 includes a first part 204 and a second part 208. Second part 208 may be attached to first part 204 by any suitable means, including adhesion, heat-fusion, connection using interlocking projections and/or cavities, and the like. Second part 208 and first part 204 may combine to form a monolithic whole; for instance, second part 208 and first part 204 may be constructed simultaneously in the same manufacturing process or set of manufacturing processes. Second part 208 and first part 204 may share only part of the manufacturing process; for instance, second part 208 and first part 204 may have core elements constructed separately, followed by the construction of a shared outer layer or shell by some manufacturing process.

Still referring to FIG. 2, first part 204 includes a base portion 232 and a first member 236. Base portion 232 of first part 204 may be a portion against which first member 236 may hold an object to which electromagnetic marker device 100 is attached, in a manner analogous to the friction grip effected by a paperclip; this may be achieved by slipping a flexible object, such as paper, between first member 236 and base portion 232, causing surfaces of the flexible object to press against surfaces of the first member 236 and the base portion 232, for instance where the first member 236 and the base portion 232 are substantially coplanar or closely adjacent as described below. Another way in which friction between first member 236, base portion 232, and an object place between them may be augmented occurs where the object forces the first member 236 and the base portion 232 apart; an elastic recoil force caused by elasticity of first member 236 and/or base portion 232 may press each of first member 236 and base against the object, increasing the friction force on the object. Where body 200 is substantially flat as discussed above, base portion 232 may also be substantially flat; this may permit the base portion 232 to be slipped between flat objects such as sheets of paper.

With continued reference to FIG. 2, first member 236 may have any suitable shape, including a substantially flat shape as described above. First member 236 may be substantially elongated. First member 236 may include rounded or beveled edges for insertion between sheets, in cracks, in slots, or in other gaps or holes. First member 236 may include a first proximal end 240 of first member 236 is attached to body 200. Attachment may be effected by any suitable means, including without limitation fixed and hinged attachments, adhesion, fusion, and the like. In an embodiment, first proximal end 240 may be fused to body 200; as a non-limiting example, first member 236 and body 200 may be partially or wholly manufactured together, for instance as described above for simultaneous manufacture of second part 208 and first part 204.

Figure 3:
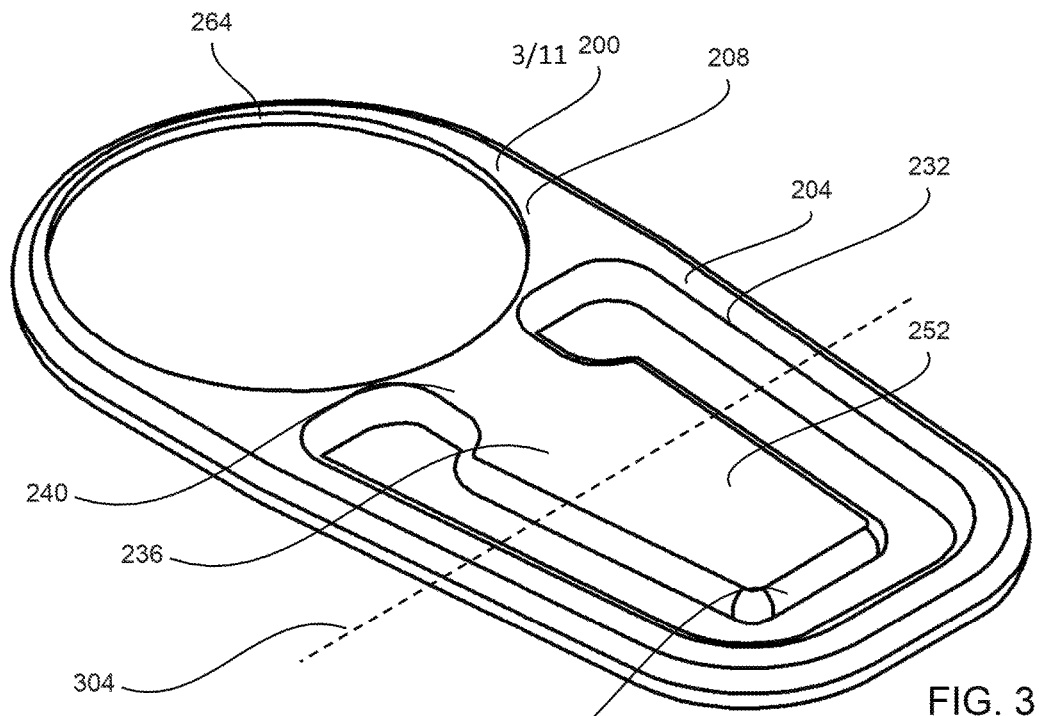
FIG. 3 is an isometric illustration of an exemplary electromagnetic marking device in an embodiment.

Continuing to refer to FIG. 2, first member 236 may include a first distal end 244. First distal end 244 may not be attached to body 200. First distal end 244 may be closely adjacent to body 200, or touching the body 200. First distal end 244 may be disposed within an opening in body 200 as further described below. First distal end 244 may be flanged; in other words, a portion of first member 236 adjacent to or at distal end 244, and/or distal end itself 244, may include a flange 248 that is wider than a middle portion 252 of first member 236 between first distal end 244 and first proximal end 240, where the middle portion 252 contains a midline 256 of first member. Midline 256 of first member 236 may be a line bisecting the first member 236 into two halves of equal length, one half containing first proximal end 240 and not first distal end 244, and the other half containing the first distal end 244 and not the first proximal end 240; in other words, midline 256 may effect a transverse division of the first member 236 with respect to a longitudinal axis drawn along first member 236 connecting the first proximal end 240 and the first distal end 244. By way of further illustration, an alternative embodiment of first electromagnetic marking device 104 is depicted in FIG. 3. As illustrated in FIG. 3, first distal end 244 may not be flanged, and instead first member 236 may have a flange near to first proximal end 240; in other words, flange may be constructed so that the first proximal end 240 is narrower than middle portion 252 containing midline 256. In an embodiment, first member 236 may not be flanged at all.

Figure 4A:
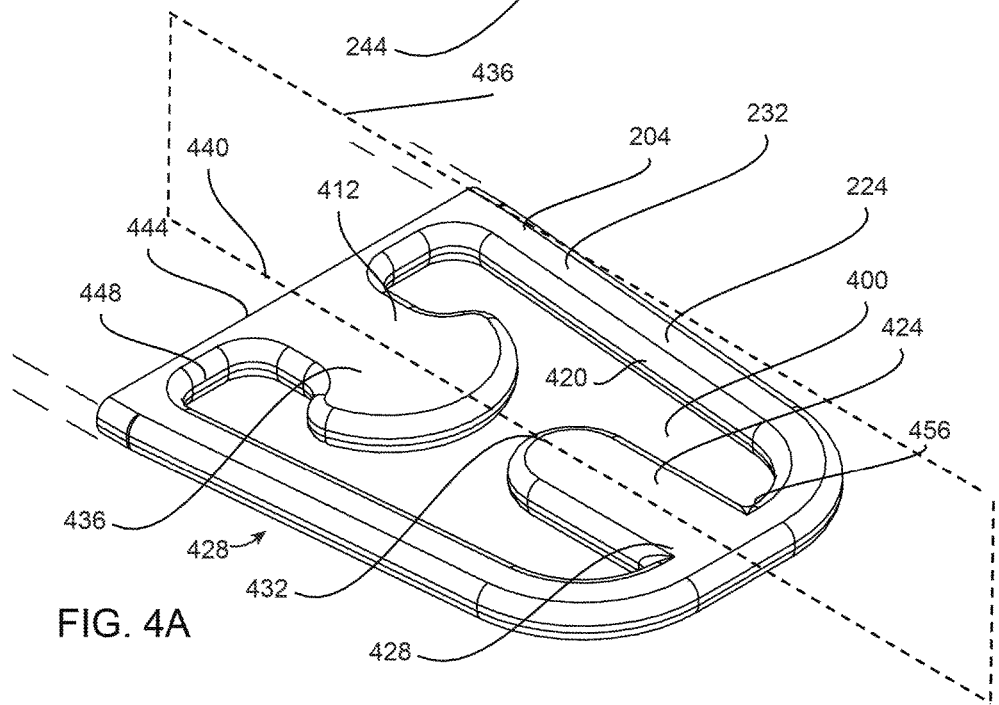
FIGS. 4A-C are isometric, top, and bottom illustrations of a portion of an exemplary electromagnetic marking device in an embodiment.
Figure 4B:
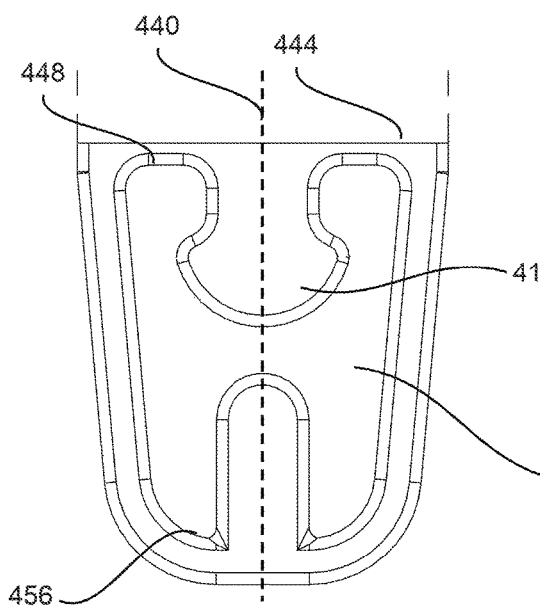
Figure 4C:
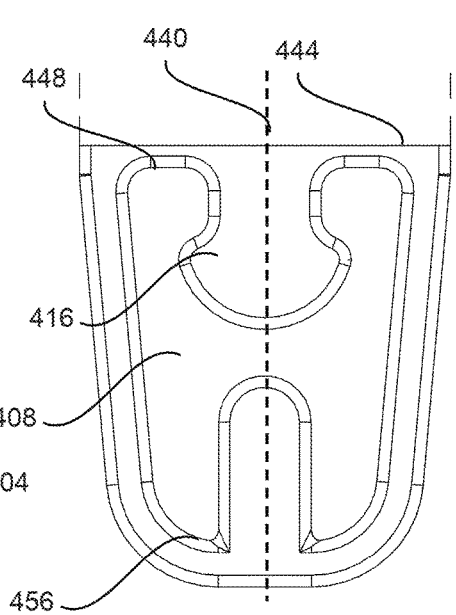

Referring now to FIGS. 4A, 4B, and 4C, an exemplary embodiment showing first part 204 in a partial cutaway of first electromagnetic marking device 104 is illustrated, in isometric, top, and bottom views, respectively. Base portion 232 may include a through-hole 400. Through-hole 400 may include a first opening 404 in top surface 224, a second opening 408 in bottom surface 228, and a void connecting the first opening 404 to the second opening 408, so that an object such as a fluid dropped into the first opening 404, when the first opening 404 is disposed vertically above the second opening 408, will tend to fall out of the second opening 408 under the influence of gravity. First member 236 may be wholly or partially contained within through-hole 400; in other words, first member 236 may be wholly or partially located between first opening 404 and second opening 408. For instance, first member 236 may have at least a portion located between first opening 404 and second opening 408. At least a portion may include first proximal end 240. At least a portion may include first distal end 244. At least a portion may include middle portion 252. Substantially all of first member 236 may be located in through-hole 400 between first opening 404 and second opening 408; for instance, first member 236 may have an upper surface 412 near to first opening 404. Upper surface 412 may be flush with first opening 404. First member 236 may have a lower surface 416 near to second opening 408. Lower surface 416 may be flush with second opening 408.

Continuing to refer to FIGS. 4A, 4B, and 4C, second part may include an inner perimeter surface 420 bounding through opening. Inner perimeter surface may be unbroken and/or connected 420. Inner perimeter surface 420 may have a gap (not shown). Gap may occupy less than 50% of inner perimeter 420; in some embodiments, gap occupies less than 25% of inner perimeter 420.

Still referring to FIGS. 4A, 4B, and 4C, first part 204 may include a second member 424. Second member 424 may have a second proximal end 428 attached to body 200. Second member 424 may have a second distal end 432 that is not attached to body 200. Second member 424 may be made of any material or combination of materials suitable for the construction of first member 236. Second proximal end 428 may be attached to body 200 by any suitable means for attaching first proximal end 240 to body. Second member 424 may be flanged; for instance, second distal end 432 may be flanged similarly to flanged first distal end 244 described above, or second proximal end 428 may be flanged. One member may have different geometric characteristics from the other, for instance, first distal end 244 may be flanged while second distal end 432 is not. Second member 424 may have at least a portion located in through-hole 400 where present; substantially all of second member 424 may be located in through-hole as described above for first member 236.

With continued reference to FIGS. 4A, 4B, and 4C, second member 424 and first member 236 may be positioned relative to one another according to any suitable geometric relationship between second member 424, first member 236, base portion 232, and/or through-hole 400. For instance, first proximal end 240 may be a first distance from second proximal end 428, and first distal end 244 may be located a second distance from second proximal end 432; in an embodiment, first distance may be greater than second distance. First distance may alternatively be less than or equal to second distance. First member 236 and second member 424 may point toward each other to some extent. for instance, given a plane 436 intersecting first proximal end 240 and second proximal end 428, each of the first member 236 and the second member 424 may have at least a portion intersecting the plane 436 that is not first proximal end 240 and second proximal end 428; at least a portion may include, for instance, first distal end 244 and/or second distal end 432. Plane 436 may longitudinally bisect first member 236, second member 424 or both. Given an axis 440 intersecting each of first proximal end 240 and second proximal end 428, each of the first member 236 and the second member 424 may have at least a portion intersecting the axis 440 that is not first proximal end 240 and second proximal end 428; at least a portion may include, for instance, first distal end 244 and/or second distal end 432. Axis 440 may longitudinally bisect first member 236, second member 424, or both.

Figure 5A:
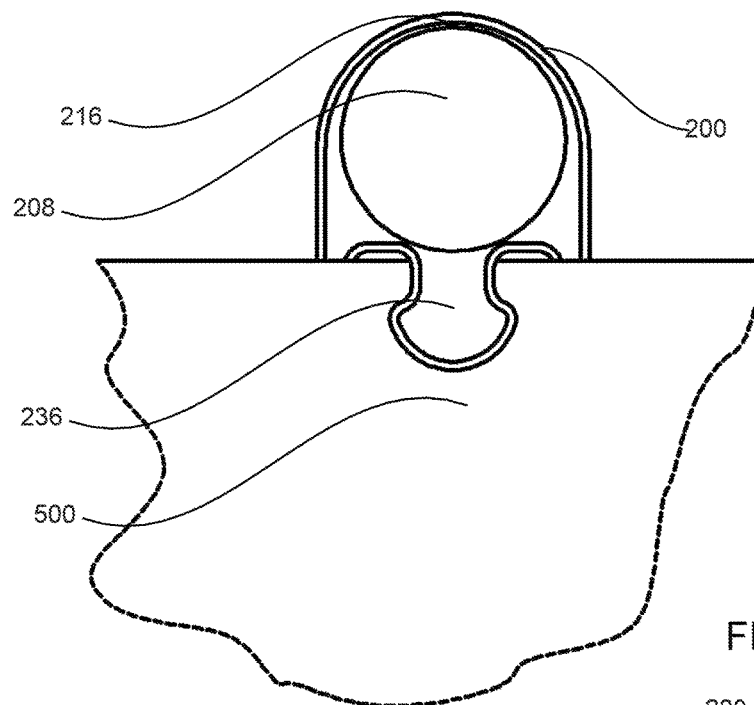
FIGS. 5A-B are schematic illustrations for use of an exemplary electromagnetic marking device in an embodiment.
Figure 5B:
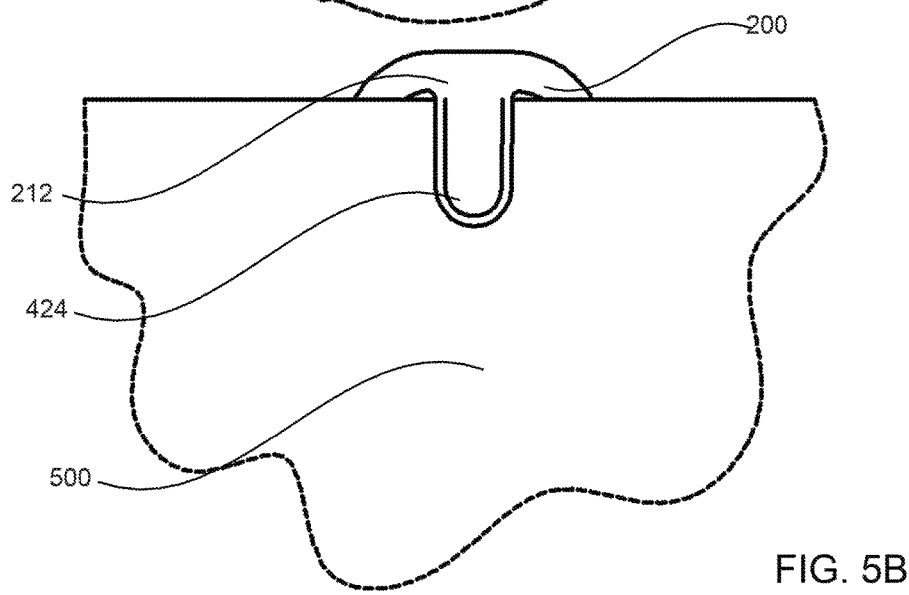

Continuing to refer to FIGS. 4A, 4B, and 4C, each of first member 236 and second member 424 may be partially or fully contained in through-hole 400. As a non-limiting example, first proximal end 240 may be attached at or near a proximal end 444 of first part 204. Proximal end 444 of first part 204 may be at a point close to the middle of a longitudinal axis of body 200 drawn from first end 212 to second end 216. First proximal end 240 may be attached at proximal end 448 of through-hole, which maybe the nearest edge of through-hole 400 to proximal end 444 of first part 204. As another non-limiting example, second proximal end 428 may be attached to body at or near second end 216. Second proximal end 428 may be attached at or near a distal end 452 of through-hole 400 where distal end 452 is defined as the edge of through-hole 400 or inner perimeter surface 420 closest to second end 216. In an embodiment, first proximal end 240 may be positioned at or near proximal end 444 as described above and second proximal end 428 may be positioned hear second end 216 as described above; first proximal end 240 may be positioned at or near proximal end 448 as described above and second proximal end 428 may be positioned hear distal end 452 as described above. Such positioning of first proximal end 240 partway between first end 212 and second end 216 may have an effect illustrated in FIGS. 5A-B, wherein clipping first electromagnetic marking device 104 to a sheet of paper 500 using first member 236 causes first end 212, including a substantial portion of body 200, to project upward from the edge of the paper 500 as a tab readily discoverable by touch as shown for example in FIG. 5A, while clipping first electromagnetic marking device 104 to the sheet of paper 500 using second member 424 as shown in FIG. 5B causes second end 216 to rest nearly flush to the edge of the paper 500; this may be used to help a person, such as a visually impaired person, mark a particular sheet or set of sheets of paper using one first electromagnetic marking device 104 as shown in FIG. 5A for rapid tactile or visual discovery, while optionally placing additional electromagnetic marking devices 100 in the position shown in FIG. 5B to prevent interference in accessing the device in the FIG. 5A position. Devices placed in the FIG. 5B position may also, for instance, more readily fit in a confined space. Devices placed in the FIG. 5A position may be arranged, for example, in a staggered or diagonal pattern on various sheets or sets of sheets for use as a dictionary-style tabbing system. Users may be able to rotate electromagnetic marking devices 100 between positions as desired to make a sheet or sheets more or less readily accessible by touch means.

Figure 6:
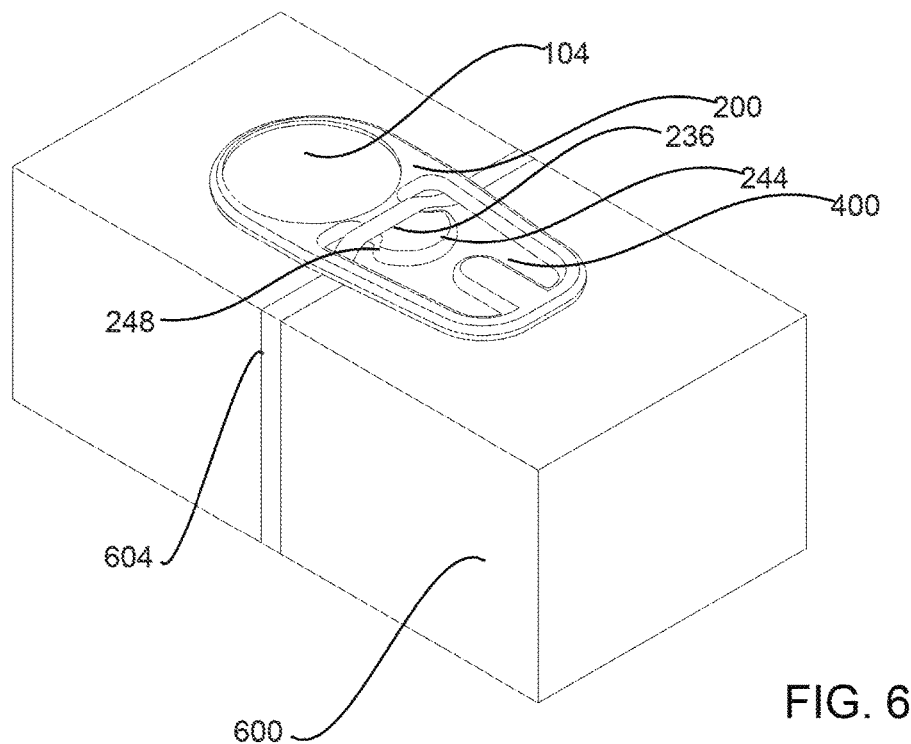
FIG. 6 is a schematic illustration for use of an exemplary electromagnetic marking device in an embodiment.

Flanged and non-flanged first or second member 132, 424 may have various advantages. For instance, as shown in FIG. 6, a first member 236 having a flanged distal end 244 may be readily engaged to an object 600 using a ligature 604 such as a rubber band, string, twine, cable-tie, or the like. Object 600 may be any object about which a ligature may be wound, or to which a ligature may be tied. Ligature 604 may be secured in place by flanged distal end 244; the security of the attachment may be enhanced where ligature 604 is passed over first member 236 and through though-hole 400 on either side of first member 236. First member 236 may be readily attached to ligature 604 by slipping first distal end 244 through ligature 604 already attached to object, and may readily be removed by a user, but flanged distal end 244 may prevent accidental dislodgement of first electromagnetic marking device 104. A first distal end 244 that is flanged may also be securely inserted in a slot or other opening, where the flanged distal end 244 may tend to secure first member 236 within the slot or other opening. Alternatively, a distal end that is not flanged may be slipped into a smaller opening, such as the tab on a soda can, permitting attachment of first electromagnetic marking device 104 to a wider range of objects.

Referring again to FIGS. 4A, 4B, and 4C, first member 236 may have a flanged distal end, while second member 424 may have no flange. Such an arrangement may advantageously combine the advantages of flanged and non-flanged ends; first electromagnetic marking device 104 may be attached using ligatures or slots where flanged end is advantageous, or may alternatively or subsequently be attached to items requiring the thinner profile of non-flanged end.

Figure 7:
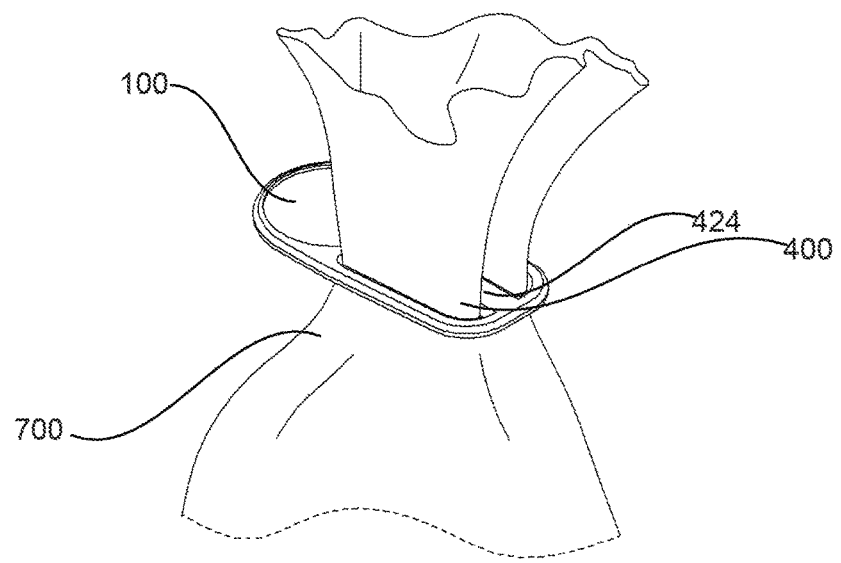
FIG. 7 is a schematic illustration for use of an exemplary electromagnetic marking device in an embodiment.

As shown for example in FIG. 7, a flexible object 700 such as a cloth, sheet of plastic or other polymer, or the opening of a bag may be secured to first electromagnetic marking device 104 by pulling flexible object 700 through through-hole 400. Where first member 236 and/or second member 424 is contained in or near to through-hole 400, first member 236 and/or second member may act to engage flexible object 700; where flexible object 700 is a bag, first member and/or second member may act to hold the bag closed. Through-hole 400 may alternatively be strung over a rope, string, or other ligature or elongated flexible item.

Referring again to FIG. 1, first electromagnetic marking device 104 includes a signal generator 108 attached to second part 208. Signal generator 108 may be attached to second part 208 by any suitable means. For example, and without limitation, signal generator 108 may be adhered or otherwise fastened to an exterior surface of second part 208. Signal generator 108 may be inserted in a slot or recess in second part 208. Signal generator 108 may be included within second part 208; for instance, first part may be manufactured around signal generator 108 by additive manufacturing and/or molding. FIG. 2 illustrates an embodiment of signal generator 108 incorporated within second part 208, shown with a partial cutaway of second part 208, but should not be construed as limiting the scope of this disclosure to such an embodiment.

Continuing to refer to FIG. 1, signal generator 108 includes a wave generator circuit 112. Wave generator circuit 112 is a circuit that converts an electrical signal into a wireless signal capable of mathematical representation using one or more wave functions including without limitation one or more superimposed sinusoidal functions in two or more dimensions; the signal may be wireless where it does not require direct contact between wave generator circuit 112 and a recipient circuit. Wireless signals may include without limitation signals sent using electromagnetic radiation; the signal may be sent using any frequency usable in communication, including without limitation radio waves, micro waves, infrared waves, and visible light. Wireless signal may include signals created through magnetic coupling, capacitive coupling, backscatter, and the like. Wave generator circuit 112 may include at least an antenna 140.

Still referring to FIG. 1, signal generator 108 includes a wave modulator circuit 116. Wave modulator circuit 116 is a circuit that generates an electrical signal to wave generator circuit 112 to be converted to a wireless signal by the wave generator circuit. Wave modulator circuit 116 may include logic circuitry to generate electrical signals. Logic circuitry may be hardwired; for instance, the logic circuitry may include logic hardware circuit components such as logic gates, multiplexors, demultiplexors, programmable circuits such as field-programmable arrays, read-only memory, and the like. Logic circuitry may include memory, which may be any memory as described below in reference to FIG. 12. Logic circuit may include a computing device as described below in reference to FIG. 12. Wave modulator circuit 116 may generate the electrical signal based on information stored in memory; information stored in memory may include information describing an object to which first electromagnetic marking device 104 is attached, as described in further detail below. Memory may be writable using an electric signal input to wave modulator circuit 116, for instance as described in further detail below.

With continued reference to FIG. 1, signal generator 108 may include a wave conversion circuit 120 for converting waves into electrical signals; in other words, signal generator 108 may be constructed to receive wireless signals as well as to transmit them. Wireless signals received may be in any form described above for wireless signals. Wave conversion circuit 120 may be included in wave generator circuit 112; for instance, an antenna 140 in wave generator circuit 112 may be formed to receive wireless signals and convert them to electrical signals, which may be received by wave modulator circuit 116. The same antenna 140 may be used to transmit and to receive wireless signals. Received signals may contain data "written" to first electromagnetic marking device 104. System may include at least a second electromagnetic marking device 124; system 100 may include a plurality of electromagnetic marking devices 124.

Still referring to FIG. 1, signal generator 108 may be a transmitter, receiver, or transceiver, including without limitation an active radio frequency identification (RFID) tag, a passive RFID tag, or the like. For instance, signal generator 108 may be any device that outputs a signal using electromagnetic radiation; the signal may be sent using any frequency usable in communication, including without limitation radio waves, micro waves, infrared waves, and visible light. Signal generator may include an antenna 140. Signal generator may include a passive transmitter, such as those used for passive radio frequency identification ("RFID") or near field communication ("NFC") tags. In some embodiments, passive transmitter includes an antenna 140 in which electric current is induced by magnetic coupling from an antenna 140; the induced electric current may power the passive transmitter, which may use additional circuitry to analyze the signal and generate a response signal. A response signal may be output by the same antenna 140. The response signal may be output by an additional antenna 140; in other words, antenna 140 may include multiple antenna 140s. In some embodiments, the signal generator 108 has a plurality of antenna 140s to enable signal generator 108 to capture the signal optimally from a plurality of angles. A signal from an interrogator may contain no information, functioning solely to activate the passive transmitter. In other embodiments, a signal from an interrogator contains information that circuitry in the passive transmitter processes.

Continuing to refer to FIG. 1, signal generator 108 may include an active transmitter. Active transmitter may be a transmitter having a power source other than an interrogation signal including without limitation a battery, "mains" connection, solar cell, or the like. Active transmitter may use the antenna 140 to broadcast a signal periodically. Active transmitter may use the antenna 140 to listen for incoming signals, and transmit in response to a detected signal. Active transmitter may perform both actions; for instance, active transmitter may periodically transmit a first signal, and also transmit one or more second signals in response to signals signal generator 108 receives. Signal generator 108 may include a transceiver. Transmitters and/or transceivers usable as signal generator 108 are described in further detail in U.S. Patent Application Ser. No. 62/446,931, filed on Jan. 17, 2017, and entitled "A SYSTEM AND METHOD FOR WAYFINDING AND INFORMATION GATHERING USING WIRELESS TECHNOLOGY," which is incorporated by reference herein in its entirety. As a non-limiting example, signal generator 108 may include a signal-based power source that generates electrical power from a received wireless signal; this may be incorporated in wave generator circuit 112, for instance as implemented in a passive RFID tag.

Referring again to FIG. 2, body 200 may include at least a tactile feature that indicates information concerning first electromagnetic marking device 104. At least a tactile feature may include at least a feature; in an embodiment, at least a three-dimensional feature may have a shape that enables a user to identify the at least a three-dimensional feature tactile means. At least a three-dimensional feature may be defined by negative space, such as a depression or recess into a surface for instance the at least a three-dimensional feature may include a recess having an outline that enables a user to distinguish at least a three-dimensional feature from other shapes. At least a three-dimensional feature may include a relief feature, which may be a feature that projects beyond a surface. Relief feature may have any suitable three-dimensional form, including a curved or manifold form or a substantially plateaued form; the relief feature may define a clear outline or exterior perimeter shape that a user can identify as pertaining to a particular meaning of at least a three-dimensional feature. At least a three-dimensional feature may include a three-dimensional shape of body 200, of second part 208, or of first part 204. At least a tactile feature may be represented by other tactilely detectable means. For instance, any element of at least a tactile feature may include a texture that distinguishes the symbols from a surrounding substrate, such as a ridged, knurled, or otherwise rough texture on a smooth substrate, or a smooth texture on an otherwise rough substrate. Any element of at least a tactile feature may have a different coefficient of static friction from the surrounding substrate. Any element of at least a tactile feature may have a different coefficient of dynamic friction from the surrounding substrate. Any element of at least a tactile feature may have different thermal properties from the surrounding substrate; for instance, any element of at least a tactile feature may conduct heat more or less readily than the substrate, allowing a user to detect the boundaries of the at least a tactile feature by detecting apparently contrasting temperatures. Any element of at least a tactile feature may have different electrical properties from the surrounding substrate.

Continuing to refer to FIG. 2, body 200 may include a tactile generator type feature 260, which may be at least a tactile feature indicating a type of signal generator 108. As a non-limiting example, tactile generator type feature 260 may include an outer perimeter shape of second part 208; for instance, outer perimeter shape of second part 208 may include a substantially rectangular shape, or a rectangular shape with rounded corners, to indicate the signal generator 108 is an "on metal" tag. Continuing the example, and as illustrated for instance in FIG. 8, a substantially circular outer perimeter shape of second part 208 may constitute a tactile generator type feature 260 indicating the signal generator 108 is not an "on metal" tag. A user may thus be able to determine whether a particular electromagnetic marker device 100 may be useable in close proximity to a conducting surface, or should be used in other contexts. In an embodiment, tactile generator type feature 260 may be first tactile generator type feature and system 200 may include a second electromagnetic marking device 124, which may have a second generator type feature 264; first tactile generator type feature 260 may indicate that first electromagnetic marking device 104 has a first category of signal generator 108 while second generator type feature 264 may indicate that second electromagnetic marking device 124 possesses a category of signal generator 108. First category may be distinct from second category; for instance, first category may indicate an "on metal" signal generator 108 as described in further detail below, while second category may indicate a signal generator 108 not designed to work when deployed against a conducting surface. Although the above discussion has described use of a signal generator 108, wave generator circuit 112, and/or wave modulator circuit 116 to wirelessly identify first electromagnetic marking device 104, system may include a device having or excluding any feature of electromagnetic marking device 104 and using an optically readable code such as a universal product code (UPC) or quick read (QR) code to identify device. Receiving device 128 and/or receiver may include any suitable optical reader to read optical code; remaining system and method limitations described herein may be performed or implemented using an identifier obtained by scanning an optical code as opposed to via wireless communication.

Figure 8:
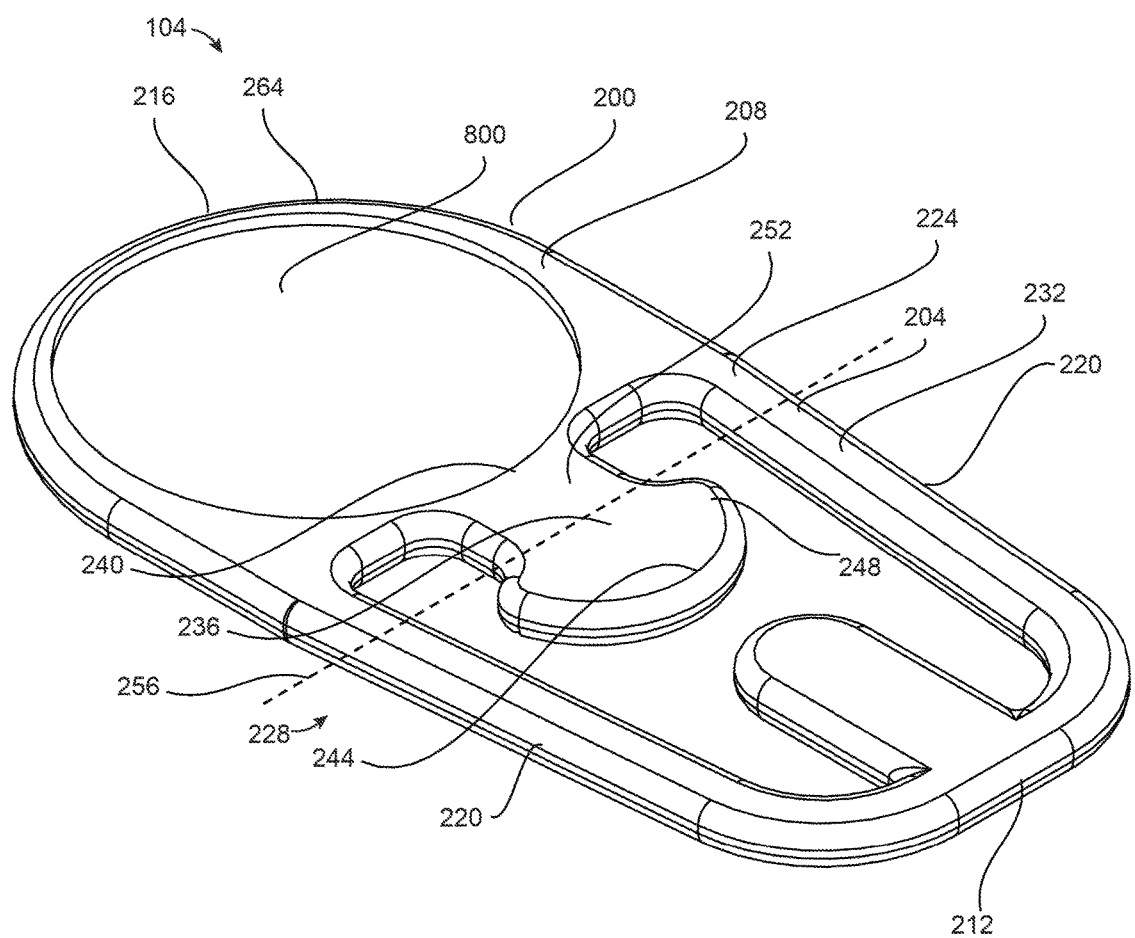
FIG. 8 is an isometric illustration of an exemplary electromagnetic marking device in an embodiment.

Referring now to FIG. 8, body 200 may include a tactile surface identifier 800, which may be a tactile feature distinguishing top surface 224 of second part 208 from bottom surface 228 of second part 208; for instance, top surface 224 may include a recess 800 identifying top surface. This may be useful to inform the user which side is a preferable side from which to interrogate or otherwise communicate with signal generator 108; for instance, where electromagnetic marker device 100 is an "on metal" device, a side with backing 268 as shown in FIG. 2 may be unable to receive wireless signals, or may receive such signals less efficiently, than the other side, so that a recess indicating the correct surface from which to communicate with signal generator 108 may enable the user to choose the correct surface.

Referring again to FIG. 1, system 100 may include at least a receiving device 128. At least a receiving device 128 may be communicatively connected via a first port 132 to signal generator 108. As used herein, one electronic device is communicatively connected to another electronic device where the two devices are able to exchange signals directly or indirectly. First port 132 may be any electrical port connecting at least a receiving device 128 to a component communicatively connecting at least a receiving device 128 to first electromagnetic marking device 104, including any electrical connector or hardwired connection. At least a receiving device 128 may for instance be connected to a receiver 136 designed and configured to communicate with signal generator 108; receiver 136 may be incorporated in at least a receiving device 128, or may communicate with at least a receiving device 128 through wired or wireless means. First port 132 may be an internal connection, hardwiring receiver 136 to at least a receiving device 128. As an illustrative example, at least a receiving device 128 may include a mobile device such as a smartphone, which may incorporate its own version of receiver 136, such as an RFID interrogator or the like; alternatively, receiver 136 may be a peripheral device connected to or in communication with receiving device 128, for example using the BLUETOOTH protocol promulgated by Bluetooth SIG, Inc. of Kirkland, Wash. First port 132 may connect to an additional transceiver (not shown) for communication with receiver 136.

Still referring to FIG. 1, at least a receiving device 128 may include any computing device as described below in reference to FIG. 12. At least a receiving device 128 may include a mobile device such as a mobile phone or "smartphone," a server or other remote device in communication with a mobile device, or any combination of one or more mobile devices with one or more remote devices. Receiver 136 may be directly connected to at least a receiving device 128 and/or to another device in communication with at least a receiving device. For instance, at least a receiving device 128 may include a server or other device connected to a mobile device via a network, and mobile device may in turn contain or be communicatively connected to receiver 136.

Continuing to refer to FIG. 1, receiver 136 may have an antenna 140. Receiver 136 may include a wireless interrogator; in other words, the antenna 140 may be capable of inducing a current in an antenna 140 of a passive transmitter through magnetic coupling, capacitive coupling, or other means. Receiver 136 may be able to receive the signal transmitted by signal generator 108 using antenna 140. In some embodiments, the receiver 136 can transmit as well as receive signals. Receiver 136 may include a transceiver, which both sends and receives signals; the transceiver may be a system on a chip, including processing, memory, or any other functions together in a single integrated circuit. Transceiver may exchange signals according to existing protocols, such as the BLUETOOTH protocol promulgated by Bluetooth SIG, Inc. of Kirkland, Wash. Transceiver may further implement a "beacon" protocol; as a non-limiting example, the beacon protocol may be implemented using the IBEACON protocol produced by Apple, Inc. of Cupertino, Calif., the EDDYSTONE protocol produced by Google, Inc. of Mountain View, Calif., or a similar protocol. Antenna 140 may include a plurality of antenna 140s; for example, and without limitation, antenna 140 may include a first antenna 140 that transmits interrogation signal, and a second antenna 140 that receives return signal. Antenna 140 may include multiple antenna 140s that receive and/or transmit signals; for instance, antenna 140 may include antenna 140s facing in various directions for transmitting interrogation signals and receiving return signals to and from various directions simultaneously. Similarly, receiver 136 may include both an antenna 140 for receiving from and/or transmitting signals to a transmitter and a transceiver that may be used for communicating with a mobile computing device, for instance as described below.

With continued reference to FIG. 1, at least a receiving device 128 is configured to receive a signal from signal generator 108 using receiver 136. In some embodiments, where signal generator 108 includes a passive transmitter as described in further detail below, receiver 136 may receive the signal by producing an interrogation signal using an interrogator, and receiving the signal generated by the passive transmitter in return. In other embodiments, where signal generator 108 includes an active transmitter as set forth in further detail below, receiver 136 listens for the transmission frequency of signal generator 108 and inputs the signal upon receiving the signal output by signal generator 108. Receiver 136 may exchange signals with signal generator 108; for instance, receiver 136 may transmit a query to signal generator 108 and receive data in response to the query. Receiver 136 may similarly receive a signal from a second transmitter or from additional transmitters situated in a navigable space, as described in further detail below. Receiver 136 and/or at least a receiving device 128 may be configured to receive content data from signal generator 108 or a second transmitter. Receiver 136 may be configured to receive product data from signal generator 108 or a second transmitter. Receiving device 128 may be designed and/or configured to perform any embodiment of method or methods described herein in reference to FIGS. 9, 10, and/or 11, or any steps thereof, in any combination.

Alternatively, or additionally, and still referring to FIG. 1, receiver 136 may have a code reader. In some embodiments, a code reader may be any device capable of reading a visual code such as a UPC laser-scanned code or a quick read ("QR") code. In some embodiments, the code reader is a laser scanner. In other embodiments, the code reader is an optical device such as a camera; for instance, where receiver 136 is a mobile device such as a mobile phone or tablet, or is communicatively connected to such a device, the code reader may be the camera of the mobile device. The mobile device may be configured to input a QR or UPC code using the camera and then extract the data contained in the code using software. In any embodiment of methods, systems, and/or devices described herein in which receiver 136 receives a return signal including a unique identifier and processes that return signal, receiver 136 may similarly obtain the unique identifier by way of a code reader, and process the unique identifier in a like manner.

Continuing to refer to FIG. 1, at least a receiving device 128 may be designed and configured to transmit and/or receive signals to and/or from signal generator 108. At least a receiving device 128 may be configured to "write" data to signal generator 108, and/or to receive data from signal generator 108. Further information concerning systems, software, and methods incorporating at least a receiving device 128 and a signal generator and exchange of data therebetween may be found in the '931 application referenced above Still referring to FIG. 1, system 100 may include a remote data store 144. Remote data store may include any hardware, software, or data structure suitable for storage and/or retrieval of data, including without limitation a relational database, which may arrange data in any manner using interrelated tables according to the dictates of efficient information storage and retrieval, a key-value data store permitting retrieval of data records according to queries matching such records to one or more data elements from "key" fields, a hash table, or any other distributed or localized data storage facility that may occur to a person of ordinary skill in the art upon reviewing the entirety of this disclosure. Remote data store 144 may be remote from electromagnetic marking device 104; that is, remote data store 144 may be stored on any receiving device 128, or any other computing device in system 100 as described herein, while remaining remote from electromagnetic marking device 104.

With continued reference to FIG. 1, system 100 may further include second port 148 communicatively connecting at least a receiving device 128 to a printer 152. Printer 152 may include a document printer, which may be any device capable of receiving one or more elements of visual data from at least a receiving device 128 and reproducing the one or more elements of visual data on a surface, such as the surface of a piece of paper or the like. Printer 152 may be used in any suitable manner, including to produce documents according to method 1100 as described below in reference to FIG. 11. Alternatively or additionally, printer 152 may include an automated manufacturing device, where an automated manufacturing device is defined as a device that performs at least one physical step in manufacturing a product at direction of a computing device; computing device, which may be any computing device as described below in reference to FIG. 12 may be installed or incorporated in automated manufacturing device, or may be communicatively connected to automated manufacturing device via wired, wireless, and/or network connection. Automated manufacturing device may include a computer numerical control (CNC) machine or other subtractive device, which forms a workpiece into a product by removal of material as directed by computer instructions; subtractive manufacturing devices may include, without limitation, an electronic discharge machining device (EDM), a wire EDM, a milling machine, a lathe, a drag-knife, or the like. Automated manufacturing device may include an additive manufacturing device. Additive manufacturing device may be any device that forms a product by deposition of material on a partially completed product; additive manufacturing device may begin by depositing initial layers or elements of material on a base-plate or other substrate, forming the product without any initial workpiece. Additive manufacturing may be performed by deposition of successive layers, for instance in a radial or vertical direction, and may deposit layers according to any suitable process, including stereolithography or other deposition of material that is "cured" to form a layer, powder and binder deposition, fused deposition of polymer or other material, sintering of materials such as metal, including laser sintering, and the like. Additive manufacturing device may include a rapid prototyping device or "3-D printer." Although system 100 has been illustrated for exemplary purposes, first electromagnetic marking device 104 may be incorporated in various alternative systems, including without limitation systems described within the '931 application incorporated by reference above.

Referring again to FIG. 2, signal generator 108 may include a backing 268 to shield signal generator 108 from a conductive object proximate to bottom side 160 of body 200. Backing 268 may protect signal generator 108 from one or more side-effects created when a wireless signal encounters a conductive surface such as a metal surface; for instance, backing 268 may allow a signal generator 108 that is a passive RFID tag to magnetically or capacitively couple to a transceiver or interrogator, without interference caused by the conductive surface. Backing 268 may convert signal generator 108 and/or first electromagnetic marking device 104 into an "on metal" tag.

In operation, and referring generally to FIGS. 1-8, a user may write to signal generator 108 information user wishes to associate with an object, and then attach first electromagnetic marking device 104 to the object using second portion 112. User may attach first electromagnetic marking device 104 to the object before or after writing to first electromagnetic marking device 104. User may write to first electromagnetic marking device 104 using any first port 132 as described above, including without limitation an RFID interrogator or other near-field communication device peripheral to or embedded in any receiving device 128 as described above. User may select first electromagnetic marking device 104 using a surface feature such as a tactile generator type feature 260, which may inform the user whether the selected first electromagnetic marking device 104 may be used near a conducting surface, for instance. User may place first electromagnetic marking device 104 using a surface feature indicating the location of backing 268 to place backing 268 in correct orientation with regard to a conducting surface. User may place first electromagnetic marking device 104 in a tab-up position as shown above in FIG. 5A to aid in visual discovery, or in a tab-down position as shown in 6B.

User may use any receiver 136 as described above to receive information from wave generator circuit 112. In some embodiments, receiver 136 and/or receiving device 128 may convey information received from wave generator circuit 112 to user. Information may include without limitation information describing the contents, identity, status, or location of the object to which first electromagnetic marking device 104 is attached; for instance, information may include location within a room, closet, or pantry of first electromagnetic marking device 104. Information may include a name, product type, or other identifying datum concerning the object. Information may include information concerning contents of the object including physical contents such as food or fluid, or data contents such as writing. Receiving device 128 may display information to user visually, or using tactile or audio output devices as described for example in the '931 application incorporated by reference above. Receiving device 128 may use information as part of a method for wayfinding as described for instance in the '931 application incorporated by reference above.

Figure 9:
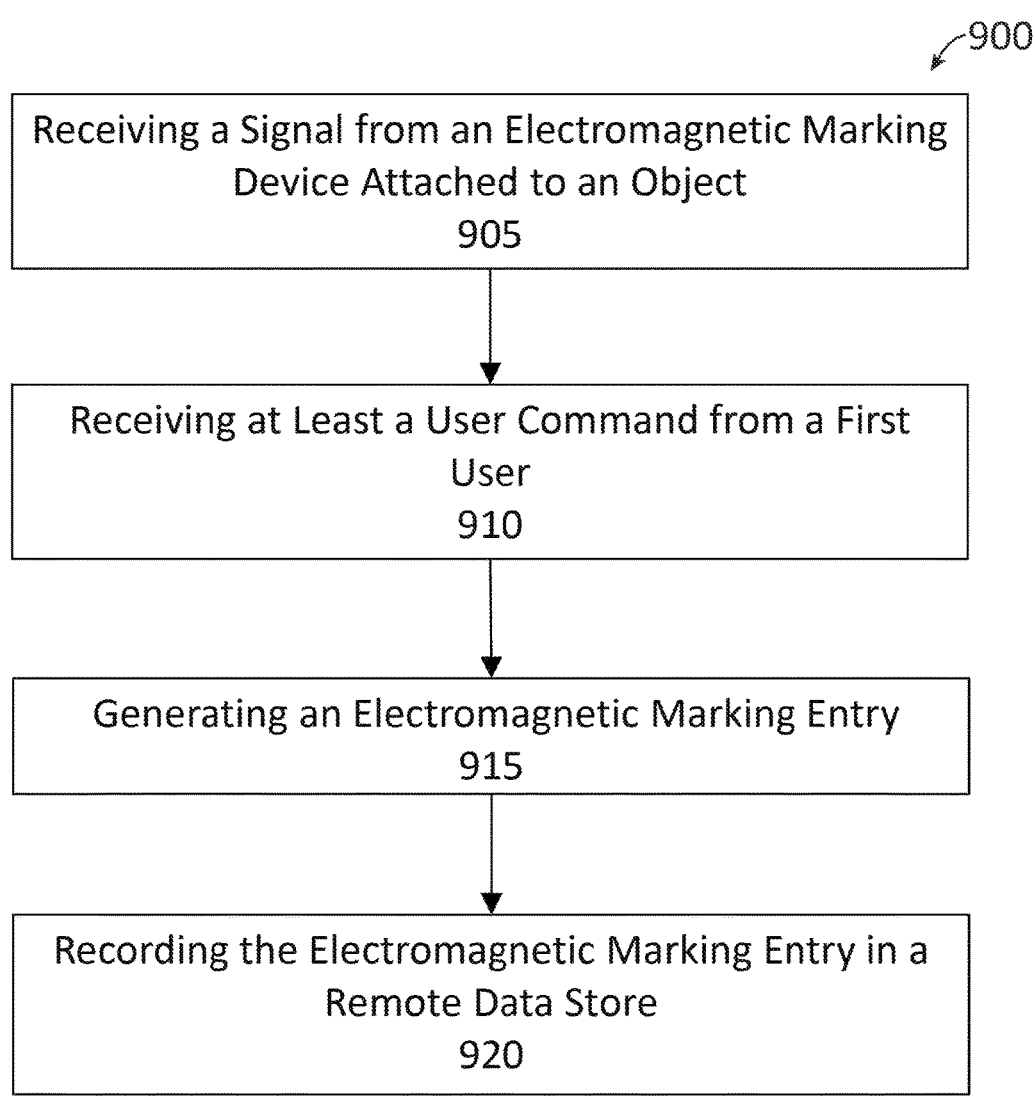
FIG. 9 is a flow diagram illustrating an exemplary method of marking an object using an electromagnetic marking device.

Referring now to FIG. 9, an exemplary embodiment of a method 900 of marking an object using an electromagnetic marking device is illustrated. At step 905, a signal from an electromagnetic marking device 104 attached to an object is received at a receiving device 128 and using a wireless receiver 136. Signal includes a unique identifier. Unique identifier may identify electromagnetic marking device unique identifier may be locally unique; that is, unique identifier may be unique to a local area, a household, or to system 200, as tracked, for instance in remote data store 144 or a similar component or module. Unique identifier may be an identifier created to be unique in general, according to a mathematical or statistical determination of uniqueness or probable uniqueness, such as the Universally Unique ID ("UUID") standard or the Globally Unique ID ("GUID") standard.

Still referring to FIG. 9, reception of the signal may be performed according to any methods or means as described herein, via any receiving device 128 and/or receiver 136 as described above. Reception of signal may be performed passively or actively; for instance, where electromagnetic marking device 104 includes an active signal generator 108, reception of signal may be accomplished by "listening" for a signal to and/or from receiver 136. Where electromagnetic marking device 104 includes a passive transponder as described above, receiving the signal may include wirelessly transmitting an interrogation signal providing electrical power to the electromagnetic marking device using an antenna 140 of the wireless receiver, and wirelessly receiving from the electromagnetic marking device, and via the antenna 140, a return signal.

At step 910, and still viewing FIG. 9, at least a user command from a first user is received at the receiving device. At least a user command may include at least a user-specific datum. At least a user-specific datum may include any information relating to first user, as opposed to electromagnetic marking device 104, object, or the like. At least a user-specific datum may include a user identifier; user identifier may include any information or combination of information usable to identify a user. User identifier may include, without limitation, a name of first user such as a first name, last name, nickname, pseudonym, or the like, a "screen name" or user name first user has selected or is selecting for interaction with system 100, a number or other code associated with first user, an electronic mail address, a place of employment, an Internet domain name or URL associated with first user, a mailing or residential address associated with first user, a date of birth of user, or any other element of data that may occur to a person of ordinary skill in the art upon reviewing the entirety of this disclosure. At least a user-specific datum may include a location-based need; a location-based need may include a location first user selects as a desired location for electromagnetic marking device 104, which may include an address, a location within a building, for instance as recorded in a building information map (BIM) or other building plan or data structure describing locations within a building, a location within another space such as a park, train station, street, public square, or vehicle such as a car, truck, boat, train, or airplane, or the like. Location may refer to a location within a filing system, including without limitation a location within a filing cabinet, envelope or "case file," a location as determined by a library catalog filing system, or the like. Location-based need may include coordinates, including without limitation Cartesian coordinates indicating a location within a space, such as a room or other space as described above, as saved, without limitation, in a BIM or similar data structure describing locations within a space; coordinates may include latitude and longitude or other geographic coordinates.

Location-based need may further include information explaining reasons for location-based need; for instance, a note or memo to file entered by first user may indicate that location has been selected based on an agreed-upon filing system or protocol, because object is or contains something user needs to be able to retrieve at location, or the like.

Continuing to refer to FIG. 9, at least a user-specific datum may include a content-based need. At least a content-based need may be any requirement first user has entered or is entering describing a desired attribute of object, including which object electromagnetic marking device 104 should be attached to, what elements of object should remain in place, such as components, a wrapper or exterior covering, a document attached to or inserted in object (for instance, a library catalog card or label). At least a content-based need may include one or more desired contents of object, or amount thereof; this may be a note not to remove anything, a description of amounts that should/may be removed from object, a description of categories of contents that are suitable for insertion in object, a description of categories of contents that are not suitable for insertion in object, a description of circumstances under which contents should be added to or removed from object, or the like. For instance, and without limitation, first user may enter a note indicating that nobody but first user should add and/or remove contents to and/or from object, that first user does not want a certain foodstuff added, or the like. At least a content-based need may include a reason, which may have any form suitable for a reason for location-based need; reason may include, as a non-limiting example, that first user is allergic to a category of food or beverage, that first user is an exclusive owner of contents, that a particular element of information on a catalog card, label, or note is vital for users to understand and/or use, or the like. Persons skilled in the art, upon reviewing the entirety of this disclosure, will be aware of many possible variations for content-based needs and/or reasons therefore that are consistent with this description.

Still referring to FIG. 9, receiving device 128 may check at least a location-based need and/or at least a content-based need against one or more other elements of data within system, including location-based needs and/or content-based needs entered by other users, location or object-related information previously entered by one or more additional users, or the like. Such information may be obtained by querying remote data store 144; a query to remote data store 144 may include unique ID, at least a user-specific datum, and/or at least an object-specific datum. Receiving device 128 may receive at least a second object-specific datum from the remote data store 144, for instance, and determine that the at least a second object-specific datum conflicts with a content-based need; determination may be accomplished by, any suitable method for comparison. For instance, numerical comparisons may be used to compare a first quantity to a second quantity, while string comparison may be used to compare one or more elements of information retrieved regarding object with one or more alphanumeric or textual strings describing content-based need; string comparison may operate on a high false-positive protocol, assuming, for instance, that any string mismatch indicates a potential conflict, or may use, for instance, natural language processing to detect synonymous or otherwise essentially identical entries. Alternatively or additionally, user-specific data, object-specific data, location-based need, and/or content-based need may be entered using a standardized format, such as selection of values from drop-down lists or other visual representations of data structures containing limited or definite options, which may then be compared according to array indices or the like. A message may be provided to the first user indicating that the at least a second object-specific datum and/or content-based or location-based need detected conflicts with the content-based need or location-based need provided by first user; message may enable user to dismiss message upon determining that conflict is unimportant, to modify one or more elements of location-based need and/or content-based need, or to contact a second user that entered any conflicting element of data.

In an embodiment, and continuing to refer to FIG. 9, at least a user command may include at least an object-specific datum. At least an object-specific datum may include any information describing object, including without limitation any information usable for location-based need and/or content-based need as described above. For example, and without limitation receiving at least an object-specific datum may include receiving a location of the object. Receiving the location of the object may include receiving, from a navigational facility communicatively connected to receiving device, the location of the object; this may be performed, in an embodiment, without or in addition to at least a user command, for instance in the form of metadata as described below. Navigational facility may include any module, device, or network that generates or detects a location of a device and/or user thereof by any means, including global positioning system (GPS) or similar navigational systems, systems that detect a device's location according to wireless telemetry or proximity to a wireless transmitter having a known location, recordation of user and/or device motion using accelerometers, gyroscopes, or any element of an inertial measurement unit (IMU), or the like. Alternatively or additionally, first user may enter location of object, or information describing location of object, directly, for instance by typing in such information in textual form, selecting such information from one or more drop-down lists, or the like. Navigational facility information may be combined with user information, for instance by using GPS or wireless telemetry to locate user and/or object at a particular geographical location, within a particular room or part of a navigable space, or the like, combined with a user description indicating, for instance, a file into which object has been placed, or something similar.

With continued reference to FIG. 9, receiving the at least an object-specific datum may include receiving at least a datum describing contents of object; at least a datum describing contents of object may include any element of information suitable for use in content-based need, or any combination thereof, including without limitation data describing materials making up object, materials or categories of materials put into object, information written on object or an item attached to or inserted in object, or the like.

Still referring to FIG. 9, receiving device 128 may determine that one or more elements of data provided as object-specific data and/or user-specific data have changed from previous data; this may be determined using any method or process of comparison as described above for detecting conflicts involving location-based need or object-based need, or any combination thereof. Change in data may include a location change; location change may be any change in any information that may describe location, including without limitation a changed geographic location, location within room, location within a building, vehicle, outdoor area, or other navigable space, and/or a filing system. Change may include any change to at least an object specific datum, including without limitation a change in contents of object, such as for instance extraction or consumption of some contents, removal or update of an element containing information, entry or removal of a ledger entry or other textual data, removal or addition of any part or component, or the like; receiving the at least an object-specific datum may additionally involve receiving an indication that the electromagnetic marking device 104 has been attached to a new object, which may include a first object to which electromagnetic marking device 104 is attached (if electromagnetic marking device 104 is new or has never been attached to anything before). In an embodiment, method 900 may include affixing and/or attaching electromagnetic marking device 104 to an object, which may involve any process or means described herein for such attachment; electromagnetic marking device 104 may be selected from a plurality of electromagnetic marking devices using, e.g., one or more tactile indicia on electromagnetic marking device 104, such as without limitation selecting an electromagnetic marking device 104 suitable for use on a conducting surface, having a desired frequency, having a desired type such as active versus passive, or the like.

At least a user command may be received prior to or subsequent to reception of signal; for instance, user may enter a user command of at least a user command once upon initializing receiving device 128 and/or receiver 136, including without limitation a user identifier used to log onto device, entry of ownership information on device, entry of information concerning user need such as allergies, medication prescriptions, or the like, entry of user status in organization, or any other user-specific and/or object specific information. Similarly, signal may be received, potentially via another device connected to receiver 136 as described above, previously, and conveyed to or retrieved by receiving device 128; for instance, a query to remote data store 144 containing any user-specific data, object-specific data, and/or metadata as described in further detail below may be submitted to remote data store 144, causing data from signal to be returned from remote data store 144. Similarly, any element of signal, user-specific data, and/or object specific data may be retrieved using any query based on any other element of signal, user-specific data, and/or object specific data.

At step 915, and continuing to refer to FIG. 9, receiving device 128 generates an electromagnetic marking entry to be submitted to remote data store 144. Electromagnetic marking entry may be generated as a function of at least an object-specific datum, at least a user-specific datum, and/or unique identifier, where generating "as a function of" a datum is meant herein as generating to include datum at least an element of data taken from datum, at least an element of data retrieved using datum, and/or at least an element of data derived via a calculation using datum. In an embodiment, generating the electromagnetic marking entry includes identifying a change in at least an-object specific datum and/or at least a user-specific datum from a previously recorded electromagnetic marking entry and generating an electromagnetic marking entry indicating the change; generating may include generating an entry based solely on changed data.

Still referring to FIG. 9, generating the electromagnetic marking entry may include generating at least a metadatum including the at least a metadatum in the electromagnetic marking entry. At least a metadatum may include any element of metadata, defined as "data describing data"; at least a metadatum may include information concerning the time, place, or manner in which at least an object-specific datum and/or at least a user-specific datum was entered. At least a metadatum may be automatically generated by receiving device 128, receiver 136, or any intervening devices or devices communicating between receiving device 128 and receiver 136. At least a metadatum may include, without limitation, a time, including a timestamp, date, or the like, a location at which receiving device 128 and/or receiver 136 was located at a time of reception of signal, a user identifier, including an identifier of first user, or the like. Metadata may thus indicate who created electromagnetic marking record, where it was created, when it was created, and so forth; as a result, a query at remote data store 144 may retrieve a plurality of electromagnetic marking records indicating times of entry, times of signal receipt, users, and/or location or entry and/or receipt. These records may be sorted and/or filtered by metadata, user-specific data, unique identifier, and/or object-specific data, permitting, without limitation, system 100 to inform a user who entered the most recent entry pertaining to a particular electromagnetic marking device and/or object, who first entered data indicating a particular change in object-specific data and/or user-specific data, or the like. This may be useful in aiding any user in locating object, finding out what has happened to it, and/or starting a discussion with a user who may have changed something of interest to the querying user.

At step 920, and still referring to FIG. 9, receiving device 128 may record electromagnetic marking entry in a remote data store 144. Electromagnetic marking entry may be transmitted to remote data store 144 using any suitable form of electronic communication, including without limitation wireless or wired transmission. Electromagnetic marking entry may alternatively or additionally be recorded at a local copy or instantiation of remote data store 144. Electromagnetic marking entry may be stored according to any data storage protocol suitable for storage and/or retrieval of data at remote data store 144, as described in further detail above.

Still viewing FIG. 9, method may include retrieving data from remote data store 144. For instance, receiving device 128 may retrieve at least a location-based need and/or content-based need entered by a second user from remote data store 144; either maybe compared with object-specific datum, user-specific datum, a location-specific need of first user, and/or a location-specific need of second user, where comparison may be performed according to any process described above. Receiving device may determine that at least an object-specific datum conflicts with the at least a location-based need; determination may be performed according to any means or method for determination as described above for determining conflicts. A message may be generated to first user and/or second user indicating existence of conflict; first user and/or second user may then be able to take steps to alleviate any issue indicated by conflict, and/or dismiss the message if the conflict is inconsequential.

Continuing to refer to FIG. 9, in an embodiment, retrieving data from remote data store 144 may further include ordering one or more retrieved electromagnetic marking entries according to one or more elements of data and/or metadata. For instance, where metadata includes a time, date, and/or timestamp on which an electromagnetic marking entry was generated or entered, retrieved electromagnetic marking entries may be ordered chronologically; as a result, electromagnetic marking entries may be displayed to a user in chronological order, enabling the user to see which electromagnetic marking entry was entered most recently and/or to view a history of electromagnetic marking entries. Such a history may enable user to discover who entered a particular electromagnetic marking entry of interest, when and/or the electromagnetic marking entry of interest was entered, and the like. User may utilize this information to contact a last person known to have interacted with object and/or electromagnetic marking device, in case either was misplaced or misfiled, to find out where object and/or electromagnetic marking device is located currently or typically, to obtain a list of users that generally interact with the object and/or electromagnetic marking device, to obtain a pattern of times during which electromagnetic marking device is used, object is moved or modified, or the like, or otherwise obtain information concerning treatment of object and/or electromagnetic marking device. Alternatively or additionally, electromagnetic marking entries may be ordered by user information of modifying users, which may aid a user in determining which user most frequently interacts with electromagnetic marking device or the like.

Figure 10:
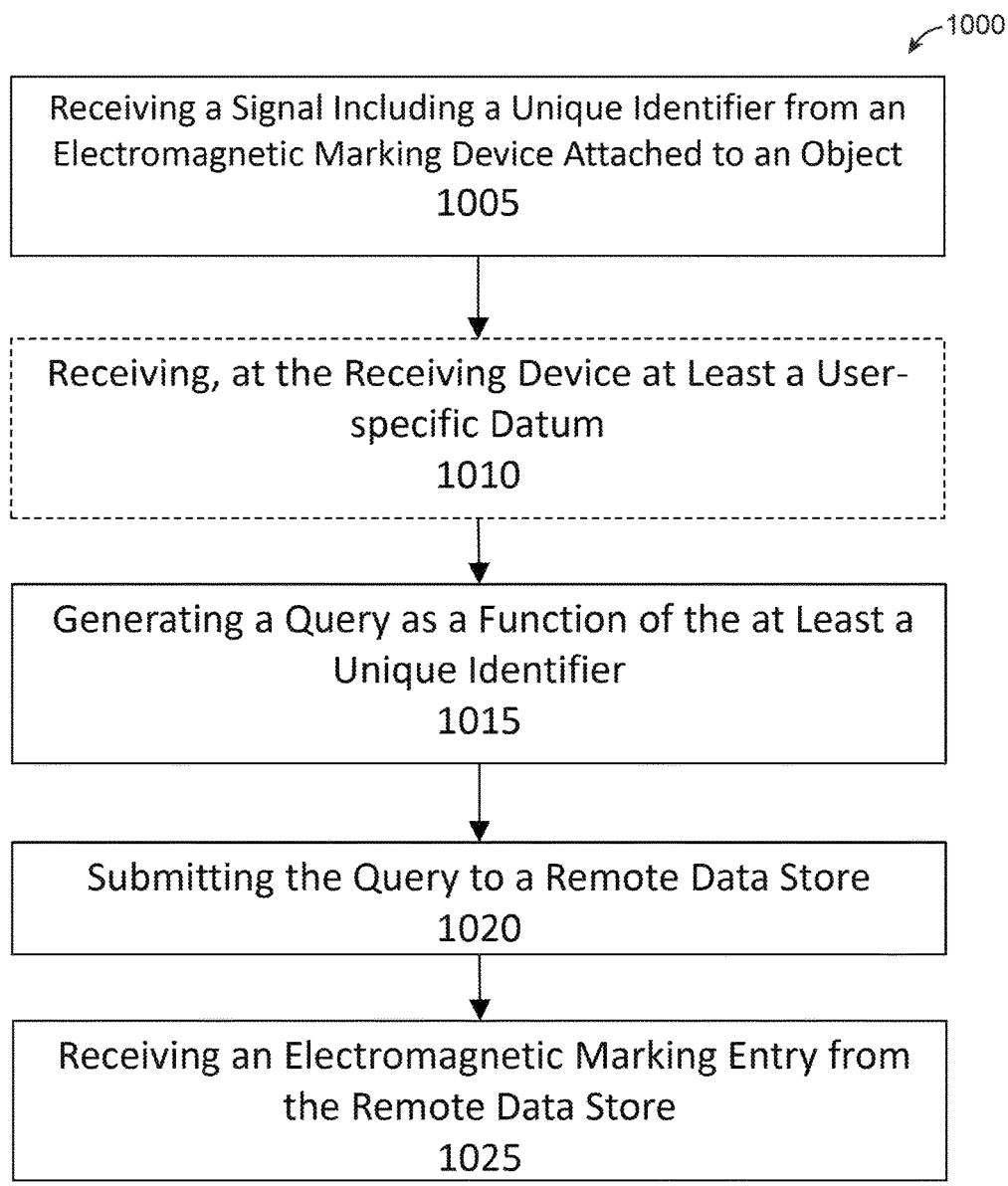
FIG. 10 is a flow diagram illustrating an exemplary method of querying an electromagnetic marking device.

Referring now to FIG. 10, an exemplary embodiment of a method 1000 of querying an electromagnetic marking device is illustrated. At step 1005 a receiving device 128 receives a signal from an electromagnetic marking device, using a wireless receiver; this may be performed according to any means or method described above in reference to FIGS. 1-9. Signal may include a unique identifier. Unique identifier may include any unique identifier as described above in reference to FIG. 9. Electromagnetic marking device 104 may be currently attached to an object; electronic marking device 104 may not be attached to an object, in which case at least an object-related datum might relate to info of previously attached object, and used to generate query. As before, receipt of signal may occur before or after other steps in method 1000, including substantially before or after, user may, for instance, have previously scanned and known location of electromagnetic marking device 104, but may be unaware of its current location, in which case a query containing unique identifier may return a more recent electromagnetic marking entry indicating its current location. At optional step 1010, an additional datum may be received at receiving device 128; additional datum may include any user-specific datum, object-specific datum, location-based need, and/or contents-based need, as described above. In an alternative embodiment, query is generated using additional datum without receiving signal.

At step 1015, receiving device 128 generates a query. Query may be generated using any data, means, or methods as described above in reference to FIGS. 1-9; query may be generated as a function of the at least a user-specific datum, at least an object-specific datum, and/or unique identifier. At step 1020, receiving devices 128 submits query to a remote data store 144; this may be implemented as described above in reference to FIGS. 1-9. At step 1025, at least an electromagnetic marking entry is received from remote data store 144. Any data described above in reference to FIGS. 1-9 for entry in or retrieval from an electromagnetic marking entry may be received; any processes for reconciliation or informing a concerning one or more electromagnetic marking entries and/or data contained therein may additionally be performed as described above.

Figure 11:
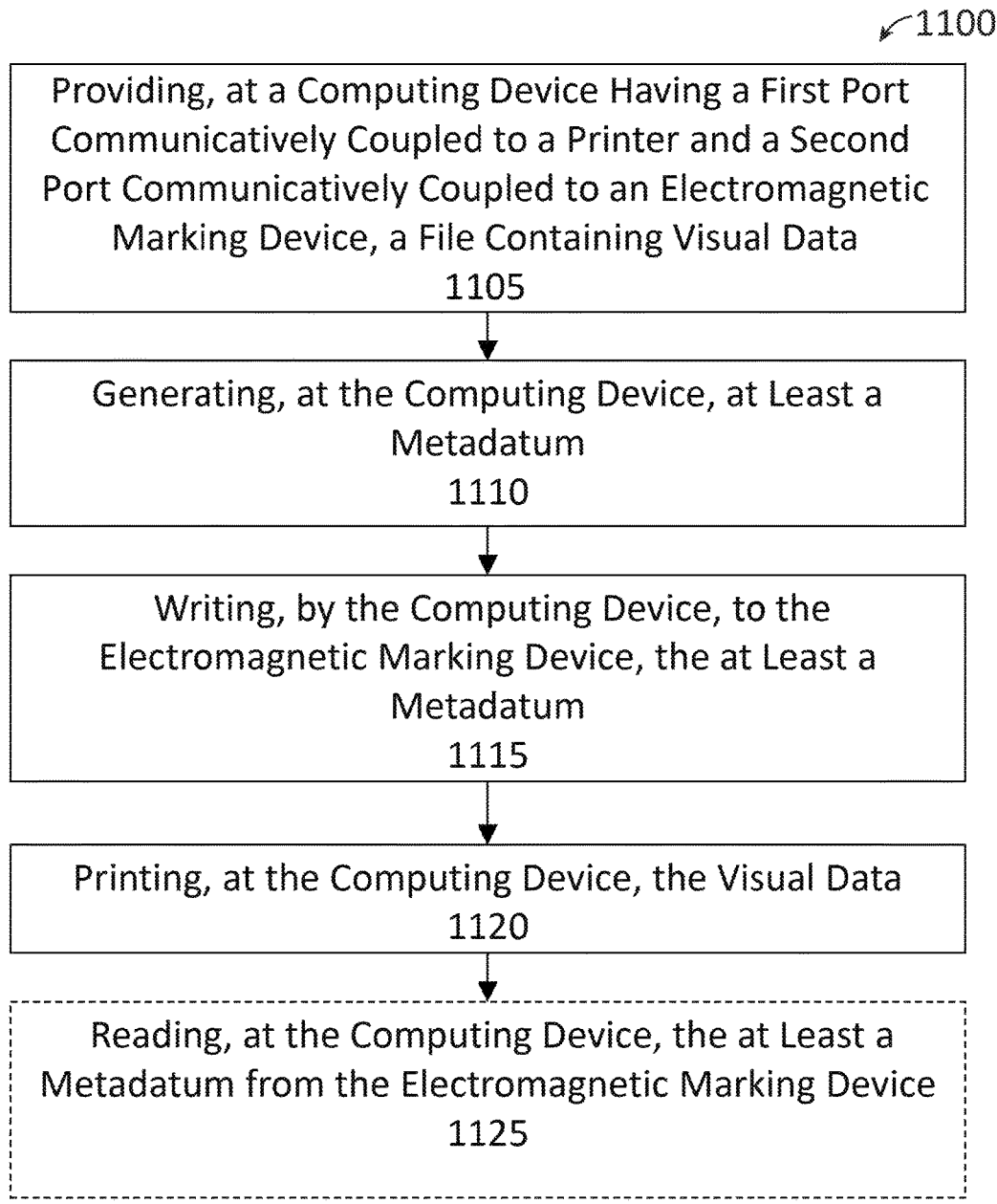
FIG. 11 is a flow diagram illustrating an exemplary method for marking a printed document using an electromagnetic marking device.

Turning now to FIG. 11, an exemplary embodiment of a method 1100 for marking a printed document and/or object using an electromagnetic marking device is illustrated. At step 1105, a file containing visual data is provided at a receiving device 128 having a first port 132 communicatively connected to a first electromagnetic marking device 104 and a second port 148 communicatively connected to a printer 152, which may include any printer 152 as described above in reference to FIG. 1, including without limitation a document printer or automated manufacturing device; communicative connecting may be achieved by any means described above in reference to FIG. 1, such as connecting to first electromagnetic marking device 104 via a receiver 136. Visual data, as used herein, may include document data, defined as data that may be represented in a two-dimensional view or printout, including without limitation text and images; where visual data is document data, file may be a document. Document may be any file from which a computing device may produce a two-dimensional image to be printed on a printer, including without limitation a visual modeling document capable of generating one or more two dimensional views, a word processor, an image document, a portable document format (PDF) document, and the like. Visual data may include automated manufacturing data, which may include at least a three-dimensional model of an object, or portion thereof, to be partially or fully produced by an automated manufacturing device, and/or at least an instruction to operate an automated manufacturing device to produce object partially or fully. Without limitation, file containing automated manufacturing data may include, or may include aspects of, a computer-aided design (CAD) file, a computer-aided manufacturing (CAM) file, an STL file, or the like. Providing file containing visual data may include receiving the file from another device, retrieving the file from memory, creating a new file with or without user input, and/or adding or removing data from the file with or without user input. As a non-limiting example, a user may enter a command to open a new document, enter text by typing, and enter a command to "save" the document in memory of the receiving device 128. As a further non-limiting example, a user may take a digital photograph, input the digital photograph to the receiving device 128 as an image file, and save the image file as the document. In still another non-limiting example, receiving device 128 may automatically generate the document as a log describing an automated process such as code compilation or batch data-processing, or as the output of such an automated process. In another non-limiting example, file may be produced in a computer modeling program, such as without limitation a CAD or CAM program.

At step 1110, and still viewing FIG. 11, at least a metadatum is generated at receiving device 128. A metadatum, as used herein, is an element of data describing the file, as distinguished from an element of data making up the contents of the file. At least a metadatum may include, without limitation, a file name, one or more file "authors" or users that entered commands at receiving device 128 to modify contents of the file such as the visual data, a date on which the file was originally created or generated, a date on which the file was copied to a current location in memory, one or more dates of modification of the file, a physical or geographical location where the file was generated, a file size (amount of memory in bytes, bits, or other measures of memory occupied by the file), and one or more cryptographic elements such as a password to open the file, a checksum, hash, or other datum having a mathematical relationship to the file contents, a digital signature encrypting a datum having a mathematical relationship to the file using the private key of a public key cryptographic system (for instance such as the Rivest-Shamir-Adelman or "RSA" system using the computational infeasibility of factoring products of large primes to create a one-way or trapdoor function), one or more elements of biometric data, or one or more secrets or secret shares. At least a metadatum may include an automatically generated metadatum; for instance, date of modification or geographic location, among other metadata, may be generated automatedly by receiving device 128 periodically or upon certain events such as a user saving the file. At least a metadatum may include a user-input metadatum; for instance, the user may enter the filename or a biometric datum to be added to the at least a metadatum. At least a metadatum may include a metadatum combining user-entered and automatedly generated data, such as a digital signature containing an automatedly generated checksum or hash of the file contents and a user-entered name, which are then automatedly encrypted using a private key.

Still viewing FIG. 11, at step 1115, the at least a metadatum is written to the first electromagnetic marking device 104. As used herein, writing to the first electromagnetic marking device 104 may include sending at least a metadatum to the first port 132. Writing to the first electromagnetic marking device 104 may further include sending the data to a receiver 136. Writing to the first electromagnetic marking device 104 may include writing to the first electromagnetic marking device 104 using the receiver 136. Alternatively or additionally, writing to first electromagnetic marking device 104 may include writing data to remote data store 144 using a unique identifier of electronic marking device 104, according to any process or process step, in any order, as described above in reference to FIGS. 9-10; furthermore, any other data may be written to electromagnetic marking device 194, as used herein, and as described in any process or process step above in reference to FIGS. 9-10.

Continuing to view FIG. 11, at step 1120 the visual data is printed at the computing device. As used herein, "printing" the visual data includes sending visual data to the second port 148 to be printed by a printer 152. Printer 152 may be any printer as described above in reference to FIG. 1. Printing may include printing the document onto paper or other media using printer 152. Printing may include manufacturing an object using an automated manufacturing process, as described above. A user may attach first electromagnetic marking device 104 to the object and/or printed document using first part 204 as described above in reference to FIGS. 1-8.

At optional step 1125, at least a metadatum may be read from the first electromagnetic marking device 104 at the receiving device 128. Reading from first electromagnetic marking device 104 includes receiving at least a metadatum at the first port 132. Reading from electromagnetic marking device may include receiving at least a metadatum from a receiver 136. Reading from first electromagnetic marking device 104 may include reading, using a receiver 136, at least a metadatum from electromagnetic marking device. Method 1100 may further include retrieving file from memory using at least a metadatum. File may be displayed to a user at receiving device 128 using visual, audio, or tactile presentation of data, as described for instance in the '918 application included herein by reference.

It is to be noted that any one or more of the aspects and embodiments described herein may be conveniently implemented using one or more machines (e.g., one or more computing devices that are utilized as a user computing device for an electronic document, one or more server devices, such as a document server) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk (e.g., a conventional floppy disk, a hard drive disk), an optical disk (e.g., a compact disk "CD", such as a readable, writeable, and/or re-writable CD; a digital video disk "DVD", such as a readable, writeable, and/or rewritable DVD), a magneto-optical disk, a read-only memory "ROM" device, a random access memory "RAM" device, a magnetic card, an optical card, a solid-state memory device (e.g., a flash memory), an EPROM, an EEPROM, and any combinations thereof. A machine-readable medium, as used herein, is intended to include a single medium as well as a collection of physically separate media, such as, for example, a collection of compact disks or one or more hard disk drives in combination with a computer memory. As used herein, a machine-readable storage medium does not include a signal.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a personal digital assistant "PDA", a mobile telephone, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 12:
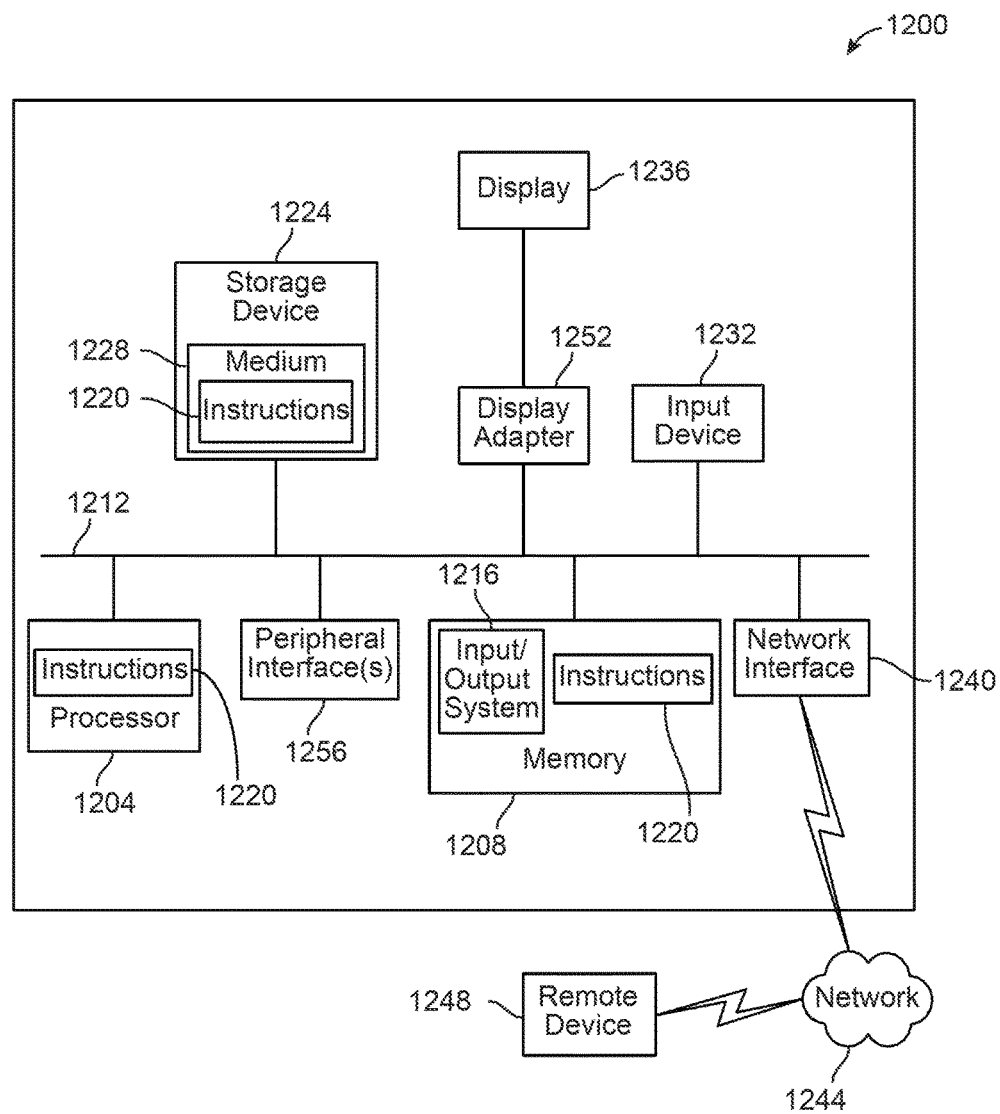
FIG. 12 is a block diagram schematically illustrating exemplary hardware implementations of embodiments of the present invention.

FIG. 12 shows a diagrammatic representation of one embodiment of a computing device in the exemplary form of a computer system or computing module 1200 within which a set of instructions for causing a control system to perform any one or more of the aspects and/or methodologies of the present disclosure may be executed. It is also contemplated that multiple computing devices may be utilized to implement a specially configured set of instructions for causing the device to perform any one or more of the aspects and/or methodologies of the present disclosure. Computer system or module 1200 includes a processor 1204 and a memory 1208 that communicate with each other, and with other components, via a bus 1212. Bus 1212 may include any of several types of bus structures including, but not limited to, a memory bus, a memory controller, a peripheral bus, a local bus, and any combinations thereof, using any of a variety of bus architectures.

Memory 1208 may include various components (e.g., machine readable media) including, but not limited to, a random access memory component (e.g., a static RAM "SRAM", a dynamic RAM "DRAM", etc.), a read only component, and any combinations thereof. In one example, a basic input/output system 1216 (BIOS), including basic routines that help to transfer information between elements within computer system 1200, such as during start-up, may be stored in memory 1208. Memory 1208 may also include (e.g., stored on one or more machine-readable media) instructions (e.g., software) 1220 embodying any one or more of the aspects and/or methodologies of the present disclosure. In another example, memory 1208 may further include any number of program modules including, but not limited to, an operating system, one or more application programs, other program modules, program data, and any combinations thereof.

Computer system 1200 may also include a storage device 1224. Examples of a storage device (e.g., storage device 1224) include, but are not limited to, a hard disk drive for reading from and/or writing to a hard disk, a magnetic disk drive for reading from and/or writing to a removable magnetic disk, an optical disk drive for reading from and/or writing to an optical medium (e.g., a CD, a DVD, etc.), a solid-state memory device, and any combinations thereof. Storage device 1224 may be connected to bus 1212 by an appropriate interface (not shown). Example interfaces include, but are not limited to, SCSI, advanced technology attachment (ATA), serial ATA, universal serial bus (USB), IEEE 1240 (FIREWIRE), and any combinations thereof. In one example, storage device 1224 (or one or more components thereof) may be removably interfaced with computer system 1200 (e.g., via an external port connector (not shown)). Particularly, storage device 1224 and an associated machine-readable medium 1228 may provide nonvolatile and/or volatile storage of machine-readable instructions, data structures, program modules, and/or other data for computer system 1200. In one example, software 1220 may reside, completely or partially, within machine-readable medium 1228. In another example, software 1220 may reside, completely or partially, within processor 1204.

Computer system 1200 may also include an input device 1232. In one example, a user of computer system 1200 may enter commands and/or other information into computer system 1200 via input device 1232. Examples of an input device 1232 include, but are not limited to, an alphanumeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), touchscreen, and any combinations thereof. Input device 1232 may be interfaced to bus 1212 via any of a variety of interfaces (not shown) including, but not limited to, a serial interface, a parallel interface, a game port, a USB interface, a FIREWIRE interface, a direct interface to bus 1212, and any combinations thereof. Input device 1232 may include a touch screen interface that may be a part of or separate from display 1236, discussed further below. Input device 1232 may be utilized as a user selection device for selecting one or more graphical representations in a graphical interface as described above.

A user may also input commands and/or other information to computer system 1200 via storage device 1224 (e.g., a removable disk drive, a flash drive, etc.) and/or network interface device 1240. A network interface device, such as network interface device 1240 may be utilized for connecting computer system 1200 to one or more of a variety of networks, such as network 1244, and one or more remote devices 1248 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1244, may employ a wired and/or a wireless mode of communication. In general, any network topology may be used. Information (e.g., data, software 1220, etc.) may be communicated to and/or from computer system 1200 via network interface device 1240.

Computer system 1200 may further include a video display adapter 1252 for communicating a displayable image to a display device, such as display device 1236. Examples of a display device include, but are not limited to, a liquid crystal display (LCD), a cathode ray tube (CRT), a plasma display, a light emitting diode (LED) display, and any combinations thereof. Display adapter 1252 and display device 1236 may be utilized in combination with processor 1204 to provide graphical representations of aspects of the present disclosure. In addition to a display device, a computer system 1200 may include one or more other peripheral output devices including, but not limited to, an audio speaker, a printer, and any combinations thereof. Such peripheral output devices may be connected to bus 1212 via a peripheral interface 1256. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. Moreover, where a "system" is identified as performing a step, any computing device, module, or other component of system may perform the step, and any specific performance by any such computing device, module, or other component is contemplated as within the scope of this disclosure. Additionally, although the methods herein have been illustrated as being performed in a specific order, the ordering is highly variable within ordinary skill to achieve the methods, systems, and software for hardware-component based geometric modifications of computer-modeled part designs described herein. Accordingly, this description is meant to be taken only by way of example, and not to otherwise limit the scope of this invention.

What is claimed is:

1. A system for marking objects using an electromagnetic marking device, the system comprising:
   a first electromagnetic marking device, wherein the first electromagnetic marking device further comprises:
     a body having a top surface and a bottom surface, the body comprising:
       a first part, wherein the first part further comprises:
         a through-hole in the first part, the through-hole comprising a first opening in the top surface of the body and a second opening in the bottom surface of the body; and first member disposed within the through-hole, the first member including a first proximal end attached to the body and a first distal end not attached to the body; and a second member disposed within the through-hole, the second member including a second proximal end attached to the body and a second distal end; and a second part attached to the first part; and a signal generator attached to the second part, the signal generator further including a wave generator circuit and a wave modulator circuit.

2. The device of claim 1, wherein the body is substantially flat.

3. The device of claim 1, wherein the first member has a first longitudinal axis running from first proximal end to first distal end, the entire longitudinal axis located between the first opening and the second opening of the through-hole.

4. The device of claim 1, wherein substantially all of the first member is contained within the through-hole.

5. The device of claim 1, wherein first member and first part generate an elastic recoil force urging them toward each other when forced apart.

6. The device of claim 1, wherein the first member further comprises a first flange located at the first distal end.

7. The device of claim 1, wherein the second distal end is disposed within the through-hole.

8. The device of claim 1, wherein the first member has a first portion that does not include the first proximal end, wherein the first portion is intersected by an axis intersecting first proximal end and second proximal end.

9. The device of claim 8, wherein the axis is located between the first opening and the second opening.

10. The device of claim 1, wherein the second member has a second portion that does not include the second proximal end, wherein the second portion is intersected by an axis intersecting first proximal end and second proximal end.

11. The system of claim 10, wherein the axis is located between the first opening and the second opening.

12. The system of claim 1, wherein the first member includes a flange located at the first distal end and the second member does not include a flange.

13. The system of claim 1, wherein:
the first proximal end is a first distance from the second part of the body;
the second proximal end is a second distance from the second part of the body; and
the second distance is greater than the first distance.

14. The system of claim 1, wherein:
the first part of the body has a third proximal end at the second part of the body, and a third distal end opposite the second part of the body;
the first proximal end is located near the third proximal end; and
the second proximal end is located near the third distal end.

15. The system of claim 1, wherein the body further comprises a first tactile feature indicating a first category, of a plurality of categories, to which the first electromagnetic marking device belongs.

16. The system of claim 15 further comprising a second electromagnetic marking device, wherein:
the second electromagnetic marking device further comprises a second tactile feature indicating a second category, of a plurality of categories, to which the second electromagnetic marking device belongs;
the second tactile feature has a different form from the first tactile feature; and
the second category is distinct from the first category.

17. The system of claim 1, wherein the signal generator further comprises a wave conversion circuit for converting electromagnetic waves into electrical signals.

18. The system of claim 1, wherein the signal generator further comprises a signal-based power source that generates electrical power from an interrogation signal.

19. The system of claim 1, wherein the signal generator further comprises a backing element separating the signal generator from a conductive surface proximate to the first electromagnetic marking device.

20. The system of claim 1, wherein the device further comprises a tactile feature distinguishing top surface from bottom surface.

\* \* \* \* \*